US010351023B2

(12) United States Patent
Hoshide et al.

(10) Patent No.: US 10,351,023 B2
(45) Date of Patent: Jul. 16, 2019

(54) SEAT MOVING/SECURING DEVICE

(71) Applicant: THK CO., LTD., Tokyo (JP)

(72) Inventors: Kaoru Hoshide, Tokyo (JP); Hiroaki Mochizuki, Tokyo (JP); Eiji Hosaka, Tokyo (JP); Hiroomi Kuribayashi, Tokyo (JP); Akito Kaneko, Tokyo (JP); Keisuke Hagiwara, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/573,580

(22) PCT Filed: Apr. 25, 2016

(86) PCT No.: PCT/JP2016/002173
§ 371 (c)(1),
(2) Date: Nov. 13, 2017

(87) PCT Pub. No.: WO2016/181623
PCT Pub. Date: Nov. 17, 2016

(65) Prior Publication Data
US 2018/0134182 A1    May 17, 2018

(30) Foreign Application Priority Data

May 14, 2015  (JP) .................................. 2015-099144
Feb. 15, 2016  (JP) .................................. 2016-025781

(51) Int. Cl.
*F16M 13/00* (2006.01)
*B60N 2/08* (2006.01)
(Continued)

(52) U.S. Cl.
CPC ......... *B60N 2/0875* (2013.01); *B60N 2/0727* (2013.01); *B60N 2/08* (2013.01);
(Continued)

(58) Field of Classification Search
CPC ............................ B64D 11/0696; B60P 7/0815
See application file for complete search history.

(56) References Cited

U.S. PATENT DOCUMENTS 4,047,689 A * 9/1977 Grendahl .............. B60P 7/0815
410/105
4,396,175 A * 8/1983 Long .................. B64D 11/0696
244/118.6
(Continued)

FOREIGN PATENT DOCUMENTS

GB          2219493 A      12/1989
JP        2006-27352 A      2/2006

OTHER PUBLICATIONS

International Search Report dated Jun. 14, 2016, issued in counterpart International Application No. PCT/JP2016/002173 (1 page).
(Continued)

*Primary Examiner* — Amy J. Sterling
(74) *Attorney, Agent, or Firm* — Westerman, Hattori, Daniels & Adrian, LLP

(57) ABSTRACT

A seat moving/securing device 10 includes a long reference member 11 extending in a longitudinal direction of a seat installation surface and securely installed, a leg part attachment member 50a having securely installed therein a leg part of a seat, a linear guide 20 attached between the long reference member 11 and the leg part attachment member 50a and enabling the leg part attachment member 50a to move horizontally along a longitudinal direction of the long reference member 11, and a locking mechanism 60 securely installed on the leg part attachment member 50a. A coil spring 68 serving as an elastic body exhibiting a pressing force is installed between the leg part attachment member 50a and the linear guide 20. Due to having this type of
(Continued)

configuration, the seat moving/securing device 10 can move and secure a seat 200 easily and quickly.

5 Claims, 23 Drawing Sheets

(51) Int. Cl.
 *B64D 11/06* (2006.01)
 *B60N 2/07* (2006.01)
(52) U.S. Cl.
 CPC ......... *B60N 2/0806* (2013.01); *B60N 2/0818* (2013.01); *B64D 11/064* (2014.12); *B64D 11/0696* (2013.01); *B60N 2/0715* (2013.01)

(56) References Cited

U.S. PATENT DOCUMENTS

| | | | |
|---|---|---|---|
| 4,449,875 A | 5/1984 | Brunelle | |
| 7,857,561 B2* | 12/2010 | Mejuhas | B64D 11/0696 410/105 |
| 10,005,558 B2* | 6/2018 | Cailleteau | B64D 11/0696 |
| 2013/0256496 A1 | 10/2013 | Majuhas | |

OTHER PUBLICATIONS

Extended (supplementary) European Search Report dated Mar. 28, 2018, issued in counterpart European Application No. 16792353.1. (7 pages).

* cited by examiner

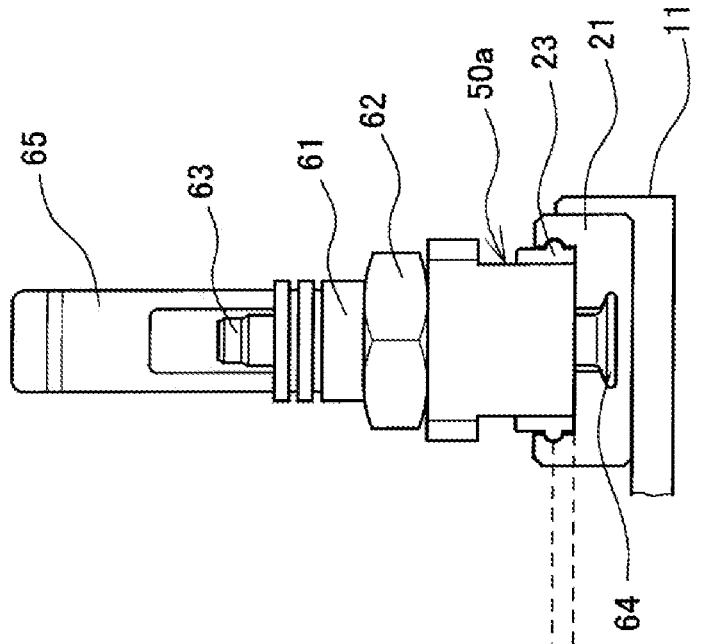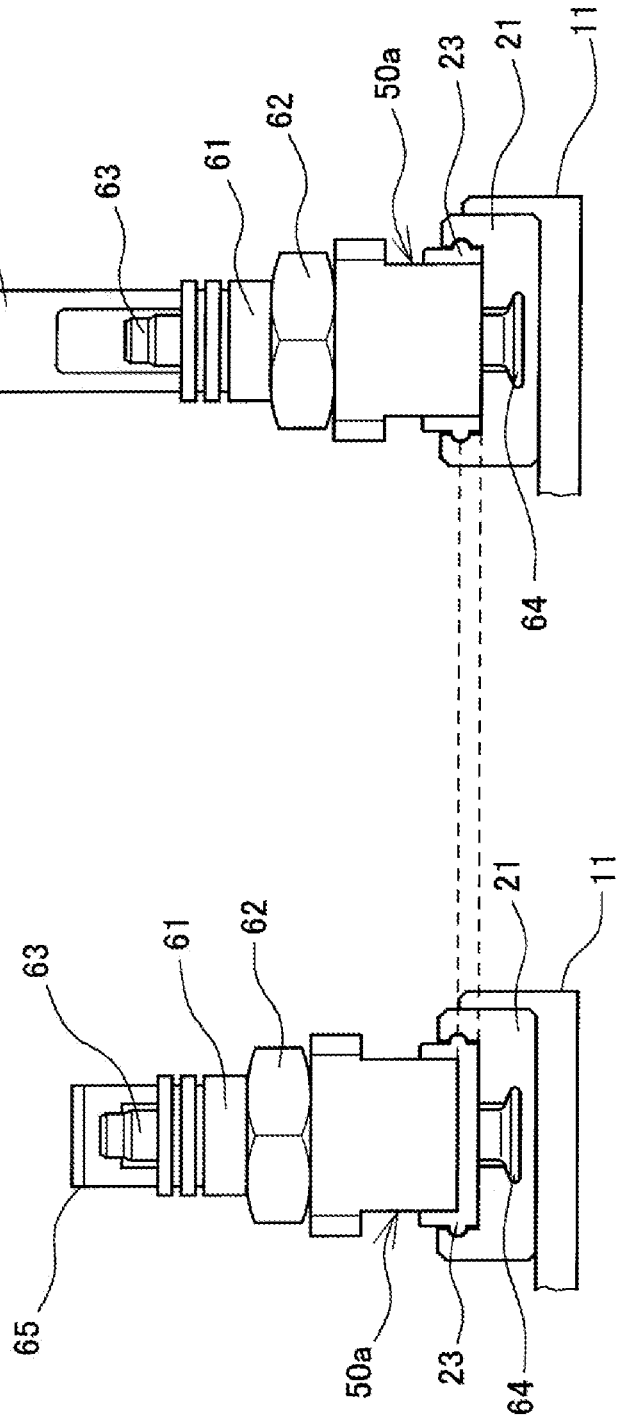

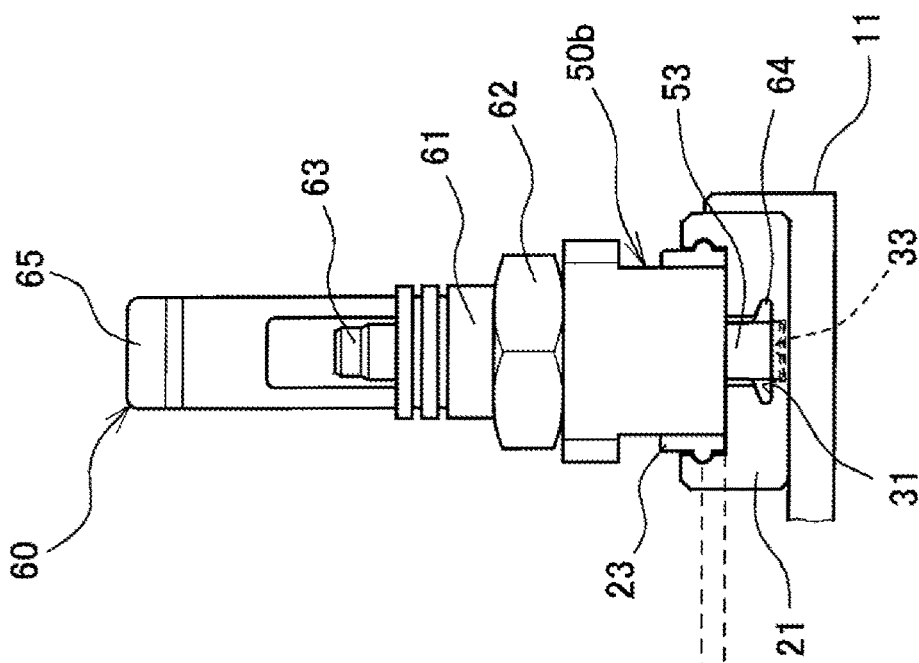
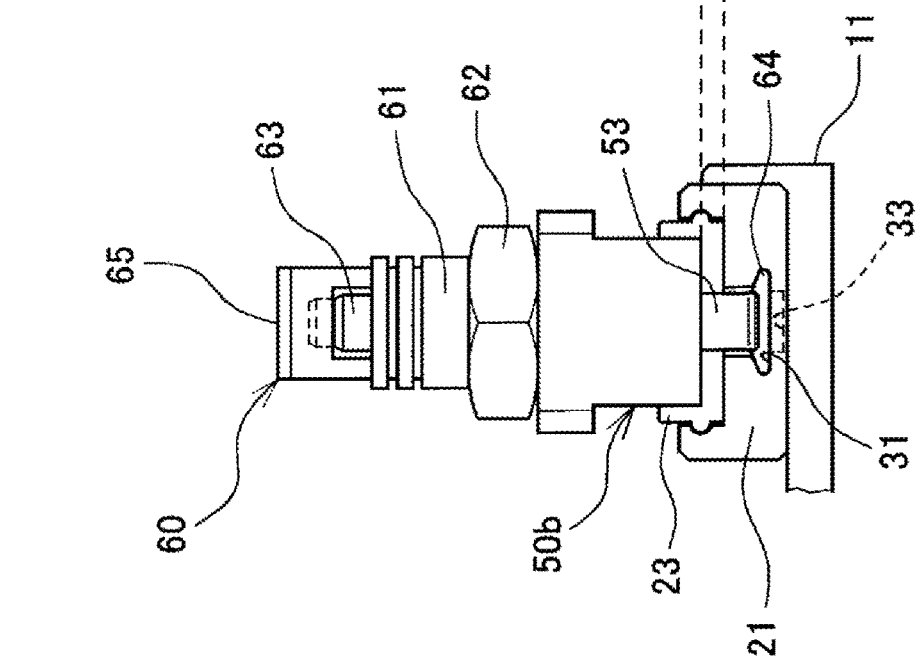

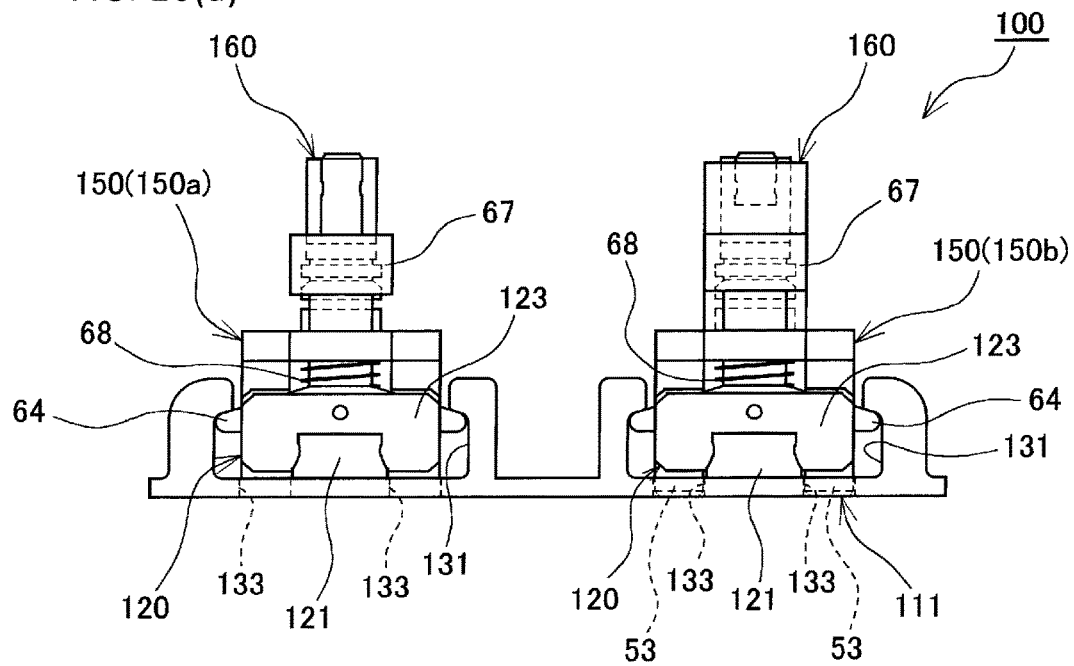
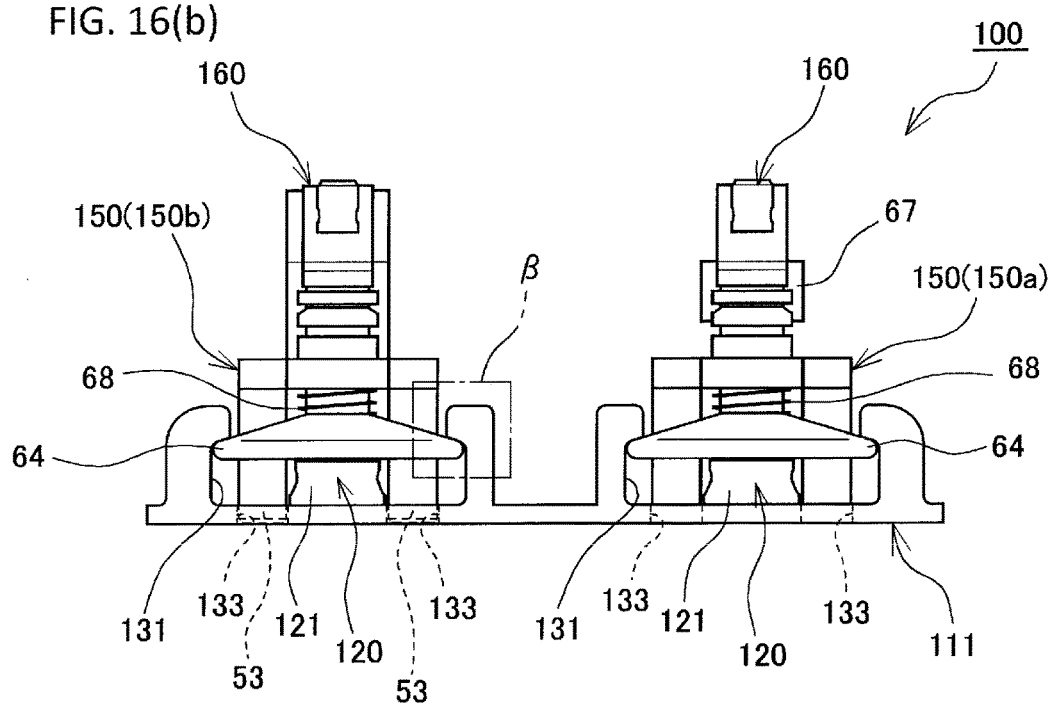

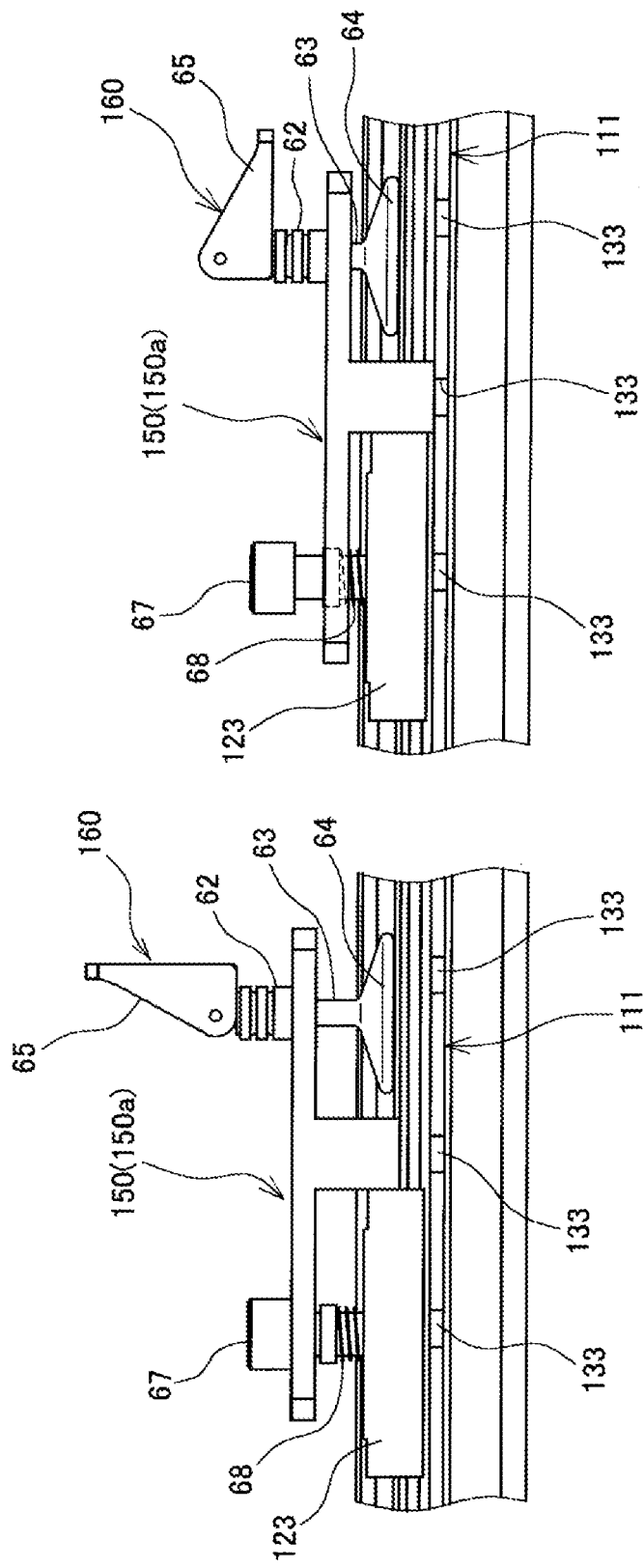

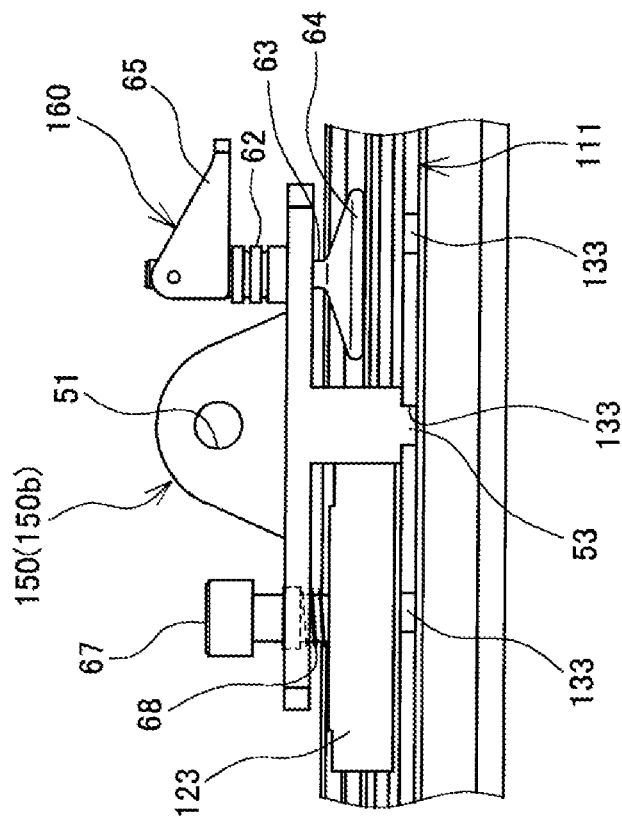
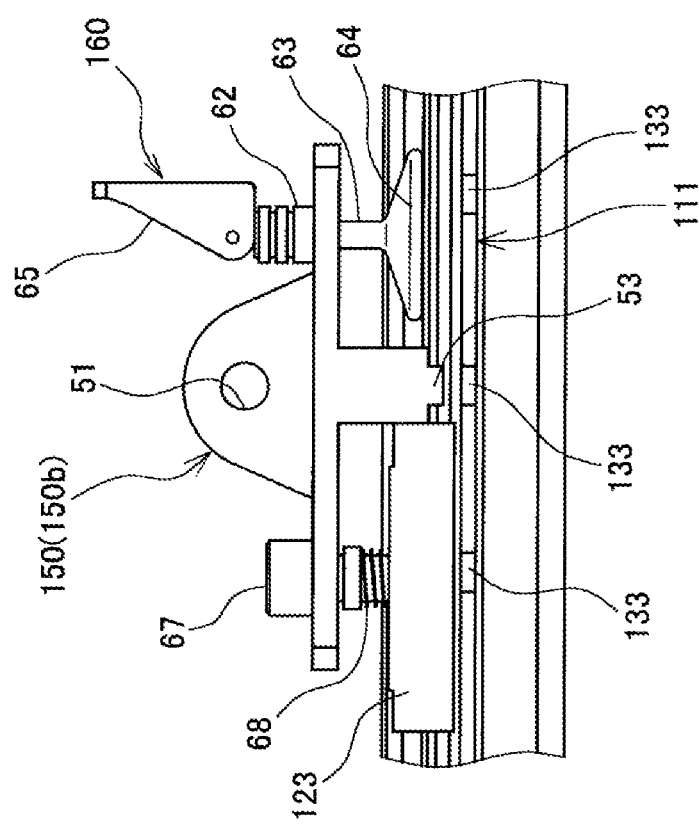

SEAT MOVING/SECURING DEVICE

TECHNICAL FIELD

The present invention relates to a seat moving/securing device.

BACKGROUND ART

In general, in a transportation means such as an aircraft and a motor-coach, seats seated by passengers are secured in advance. For this reason, an operating company operating the transportation means has a business limitation in which the operating company must sell boarding tickets and passenger tickets to customers to correspond to the predetermined number of seats.

However, in the transportation means such as an aircraft and a motor-coach, in a case in which the distance between seats in a front-and-rear direction can be changed in accordance with a load factor, more diversified services can be offered. For example, in a case in which the load factor is high, the distance between seats in the front-and-rear direction is shortened so that more passengers may use the transportation means to enable the number of passengers accommodated by one aircraft or one motor-coach to be increased. Consequently, in a peak season in which a transportation demand increases, passengers who would move on to other transportation means in a usual case can be acquired. Also, for example, in a case in which the load factor is low, the distance between seats in the front-and-rear direction is increased to enable seats improved in comfort to be prepared. Thus, even in an off-season in which the transportation demand decreases, a unit price per passenger can be raised by improving the value of the seat. In this manner, in the conventional transportation means, desired is a seat moving/securing device enabling an optimal service to be offered in accordance with various circumstances by shortening the distance between seats seated by passengers in the front-and-rear direction or increasing the distance between seats in the front-and-rear direction.

As literature disclosing the contents relating to the technique of this kind, Patent Literature 1 described below exists, for example. In Patent Literature 1 described below, a method for moving a seat to be used to move a seat in an aircraft is disclosed.

CITATION LIST

Patent Literature

Patent Literature 1: JP 2006-27352 A

DISCLOSURE OF THE INVENTION

Problems to be Solved by the Invention

However, the method for moving a seat described in Patent Literature 1 described above requires many members such as a jack device and an adapter member and many processes for moving a seat when the seat is moved, which requires great effort to move the seat.

That is, while Patent Literature 1 described above discloses an idea itself of moving a seat in an aircraft, Patent Literature 1 does not disclose a means to move or secure the seat easily and quickly. Accordingly, the method disclosed in Patent Literature 1 described above is nothing less than a technique not actually applicable to a transportation means, which is generally operated by minute.

The present invention is accomplished by taking the cases presenting in the above conventional techniques into consideration thereof, and an object thereof is to provide a seat moving/securing device enabling a seat for use in a transportation means such as an aircraft and a motor-coach to be moved and secured easily and quickly.

Means for Solving the Problems

A seat moving/securing device according to the present invention includes: a long reference member extending in a longitudinal direction of a seat installation surface and securely installed; a leg part attachment member having securely installed therein a leg part of a seat; a linear guide attached between the long reference member and the leg part attachment member and enabling the leg part attachment member to move horizontally along a longitudinal direction of the long reference member; and a locking mechanism securely installed on the leg part attachment member, in which an elastic body exhibiting a pressing force is installed between the leg part attachment member and the linear guide.

Effects of the Invention

According to the present invention, it is possible to provide a seat moving/securing device enabling a seat to be moved and secured easily and quickly.

BRIEF DESCRIPTION OF THE DRAWINGS

FIGS. 8(a) and 8(b) each illustrates binding and release states between the leg part attachment member for the front-side leg part and the flanged part in accordance with the first embodiment, FIG. 8(a) illustrates a state in which the binding state between the leg part attachment member for the front-side leg part and the flanged part is released in accordance with the first embodiment, and FIG. 8(b) illustrates a state in which the binding state between the leg part attachment member for the front-side leg part and the flanged part is carried out in accordance with the first embodiment.

FIGS. 11(a) and 11(b) each illustrates binding and release states between the leg part attachment member for the rear-side leg part and the flanged part in accordance with the first embodiment. FIG. 11(a) illustrates a state in which the binding state between the leg part attachment member for the rear-side leg part and the flanged part is released in accordance with the first embodiment, and FIG. 11(b) illustrates a state in which the binding state between the leg part attachment member for the rear-side leg part and the flanged part is carried out in accordance with the first embodiment.

FIG. 12(a) is a perspective view, and FIG. 12(b) is a side view illustrating a main part of the seat.

FIGS. 16(a) and 16(b) each illustrates a state in which the binding between the leg part attachment member and the flanged part is carried out in accordance with the second embodiment. FIG. 16(a) is a front view illustrating a state in which the binding between the leg part attachment member and the flanged part is carried out in accordance with the second embodiment, and FIG. 16(b) is a rear view illustrating a state in which the binding between the leg part attachment member and the flanged part is carried out in accordance with the second embodiment.

FIG. 18(a) is an enlarged view of a main part (a part labeled with reference numeral α in FIG. 15(b)) illustrating a state in which the binding state between the leg part attachment member and the flanged part is released in accordance with the second embodiment, and FIG. 18(b) is an enlarged view of a main part (a part labeled with reference numeral β in FIG. 17(b)) illustrating a state in which the binding state between the leg part attachment member and the flanged part is carried out in accordance with the second embodiment.

FIGS. 19(a) and 19(b) each illustrates the binding state between the leg part attachment member for a front-side leg part and the flanged part in accordance with the second embodiment. FIG. 19(a) is a vertical cross-sectional view illustrating a state in which the binding state between the leg part attachment member for the front-side leg part and the flanged part is released in accordance with the second embodiment, and FIG. 19(b) is a vertical cross-sectional view illustrating a state in which the binding state between the leg part attachment member for the front-side leg part and the flanged part is carried out in accordance with the second embodiment.

FIGS. 20(a) and 20(b) each illustrates the binding state between the leg part attachment member for a rear-side leg part and the flanged part in accordance with the second embodiment. FIG. 20(a) is a vertical cross-sectional view illustrating a state in which the binding state between the leg part attachment member for the rear-side leg part and the flanged part is released in accordance with the second embodiment, and FIG. 20(b) is a vertical cross-sectional view illustrating a state in which the binding state between the leg part attachment member for the rear-side leg part and the flanged part is carried out in accordance with the second embodiment

FIG. 22(a) illustrates a state in which binding of a seat is released, and FIG. 22(b) illustrates a state in which the binding of the seat is carried out.

FIG. 23(a) is an external perspective view of the device, and FIG. 23(b) is a side view of the device.

MODE FOR CARRYING OUT THE INVENTION

Hereinbelow, embodiments for carrying out the present invention will be described with reference to the drawings. It is to be noted that each of below embodiments does not limit the invention according to each claim, and that all combined characteristics described in each of the embodiments are not necessarily required as means to achieve the invention.

[Seat Moving/Securing Device 10 in Accordance with First Embodiment]

Figure 1:
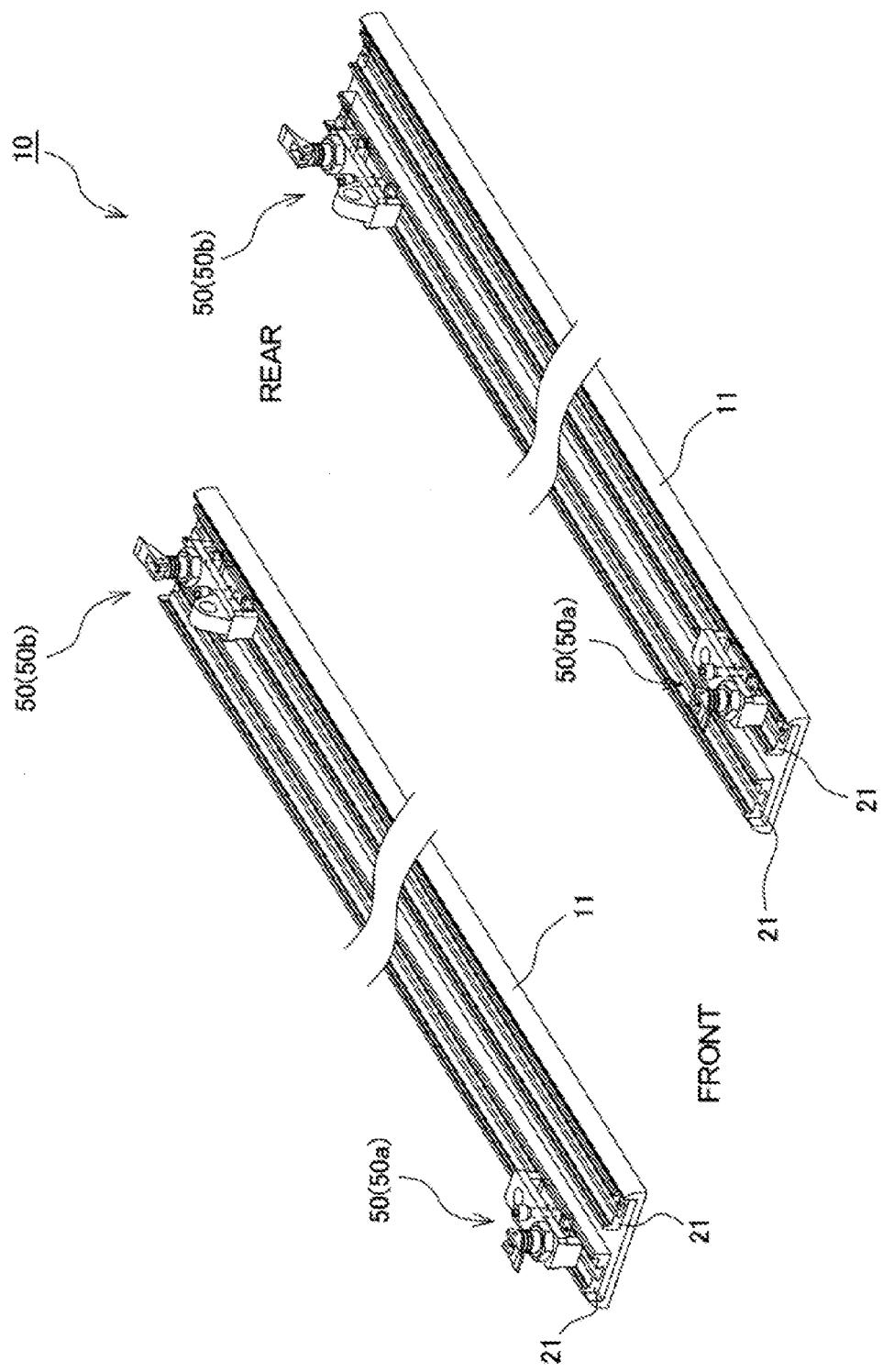
FIG. 1 is a perspective view illustrating a configuration example of a seat moving/securing device in accordance with a first embodiment.
Figure 2:
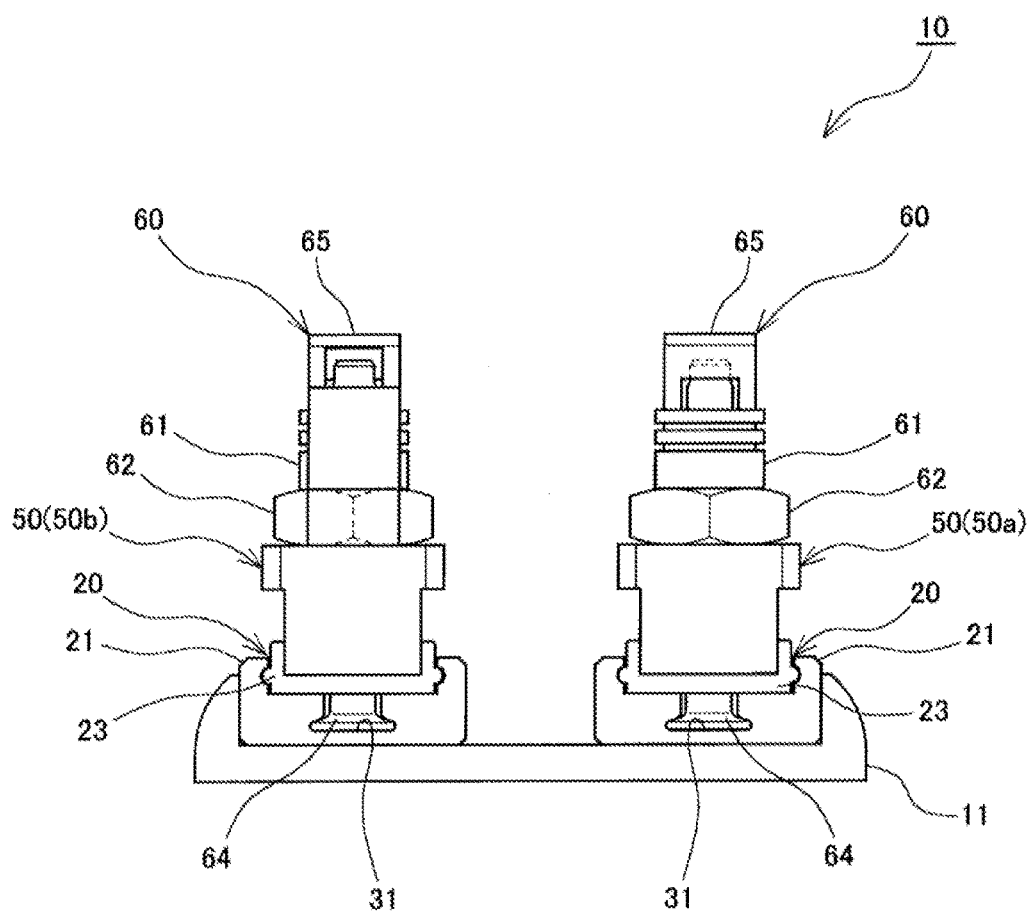
FIG. 2 is a front view for describing the seat moving/securing device in accordance with the first embodiment.
Figure 3:
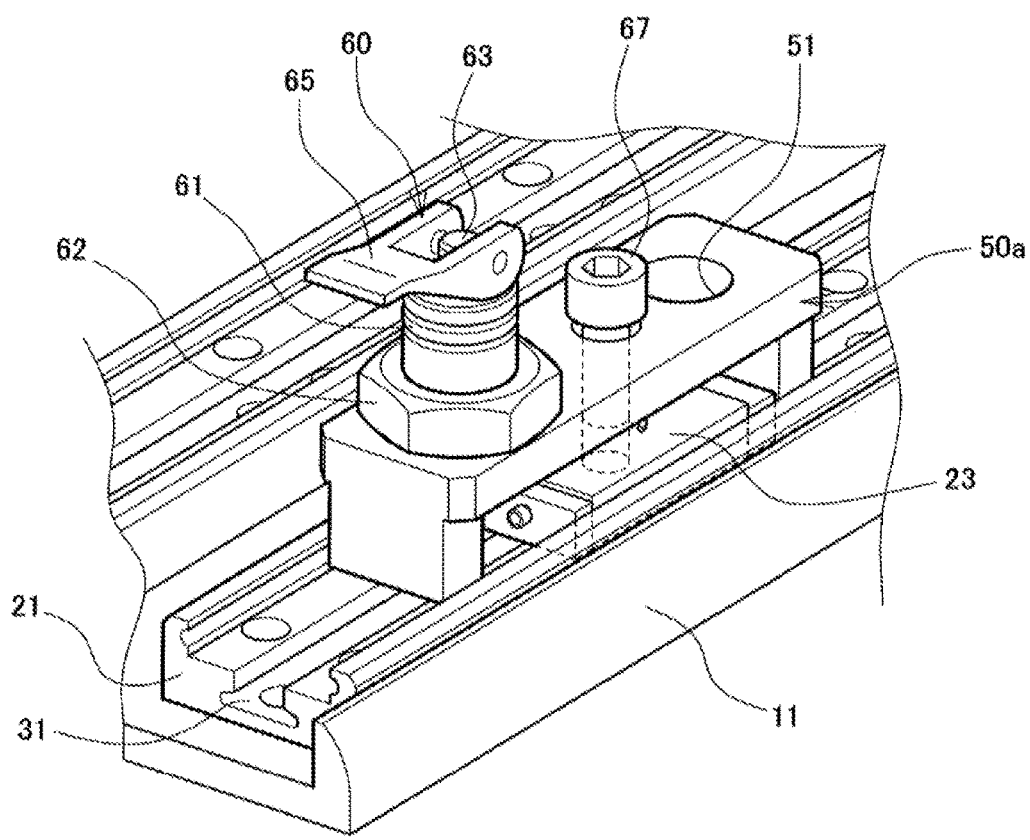
FIG. 3 is a perspective view illustrating a configuration example of a main part of the seat moving/securing device for a front-side leg part in accordance with the first embodiment.
Figure 4:
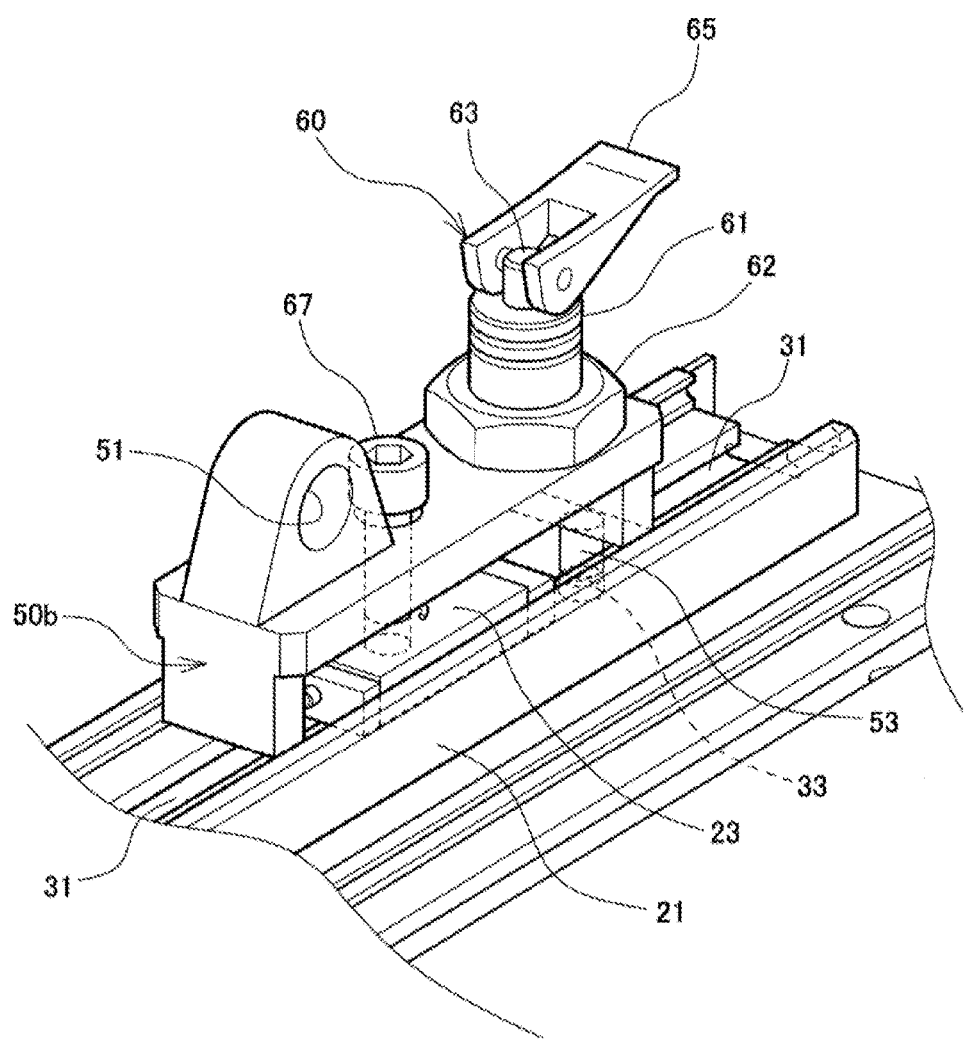
FIG. 4 is a perspective view illustrating a configuration example of a main part of the seat moving/securing device for a rear-side leg part in accordance with the first embodiment.
Figure 5:
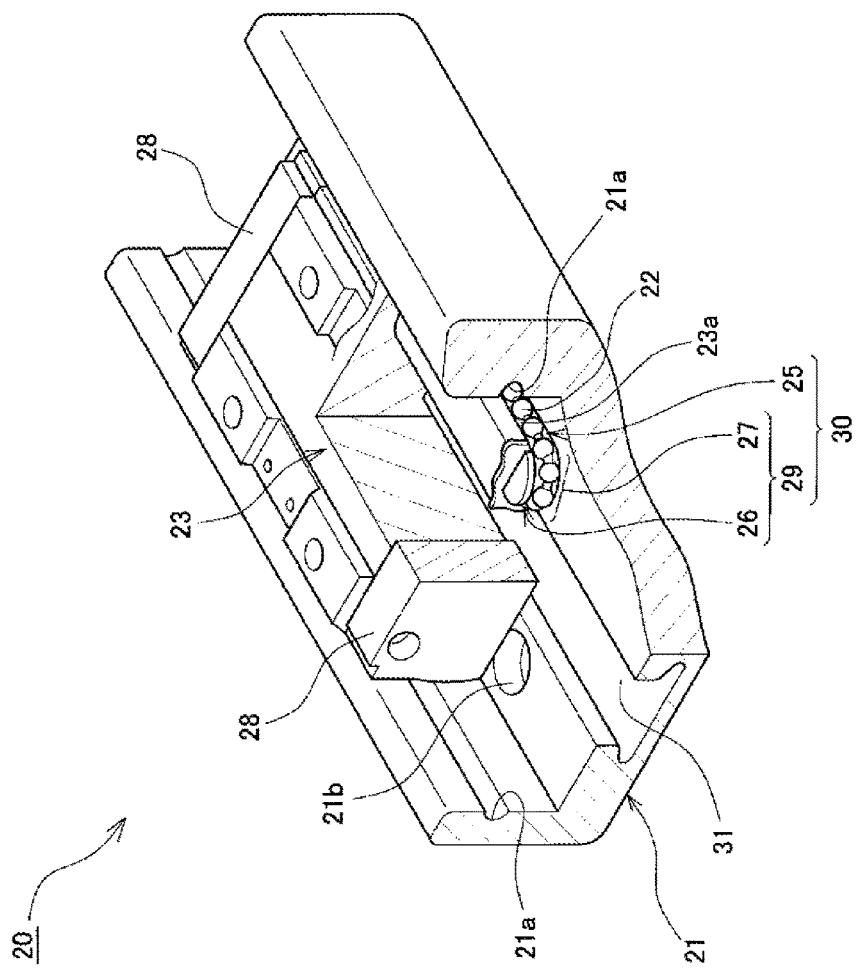
FIG. 5 is a partially broken perspective view illustrating a linear guide in accordance with the first embodiment.
Figure 6:
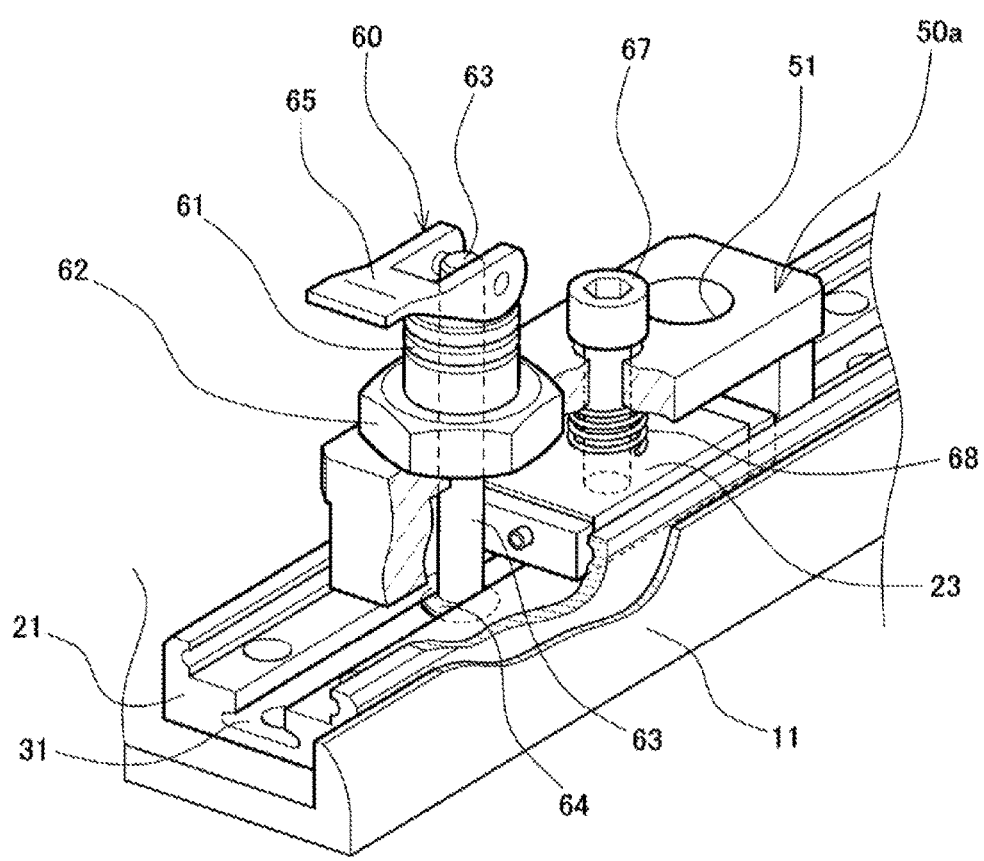
FIG. 6 is a vertical cross-sectional view illustrating a state in which binding between a leg part attachment member for the front-side leg part and a flanged part is released in accordance with the first embodiment.
Figure 7:
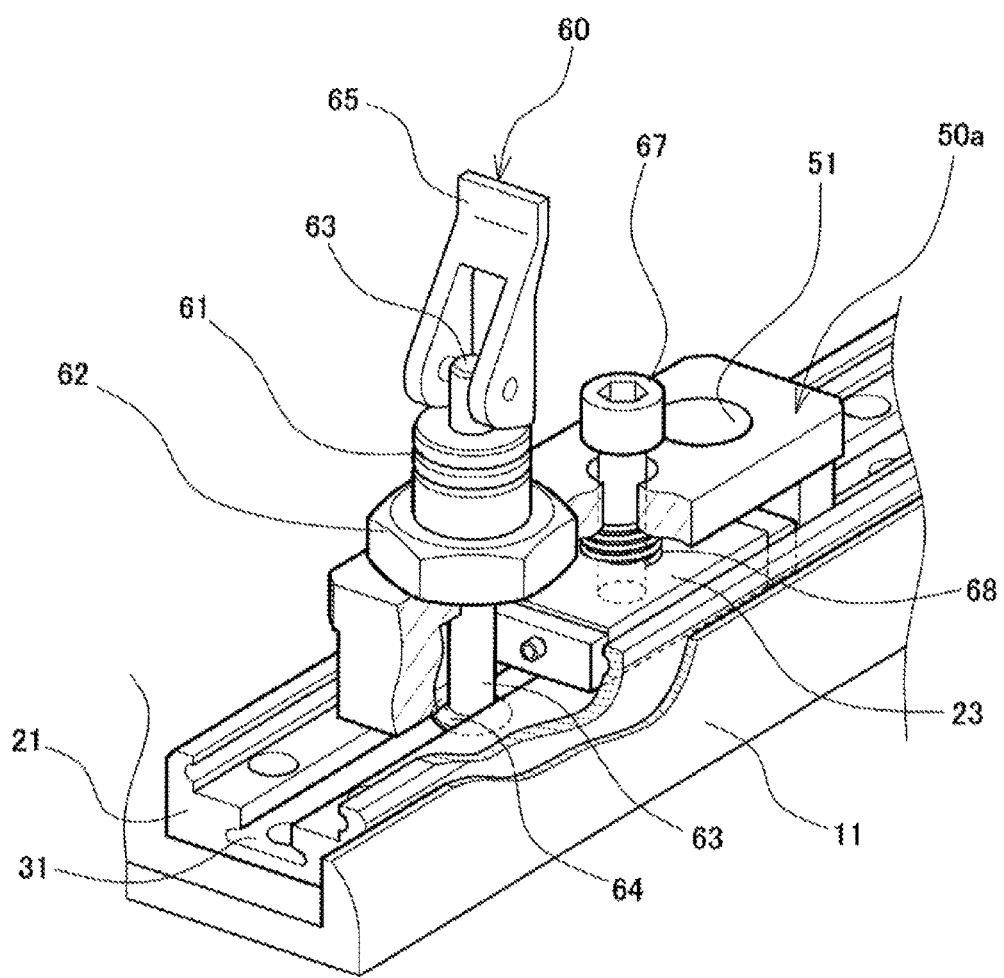
FIG. 7 is a vertical cross-sectional view illustrating a state in which the binding between the leg part attachment member for the front-side leg part and the flanged part is carried out in accordance with the first embodiment.
Figure 9:
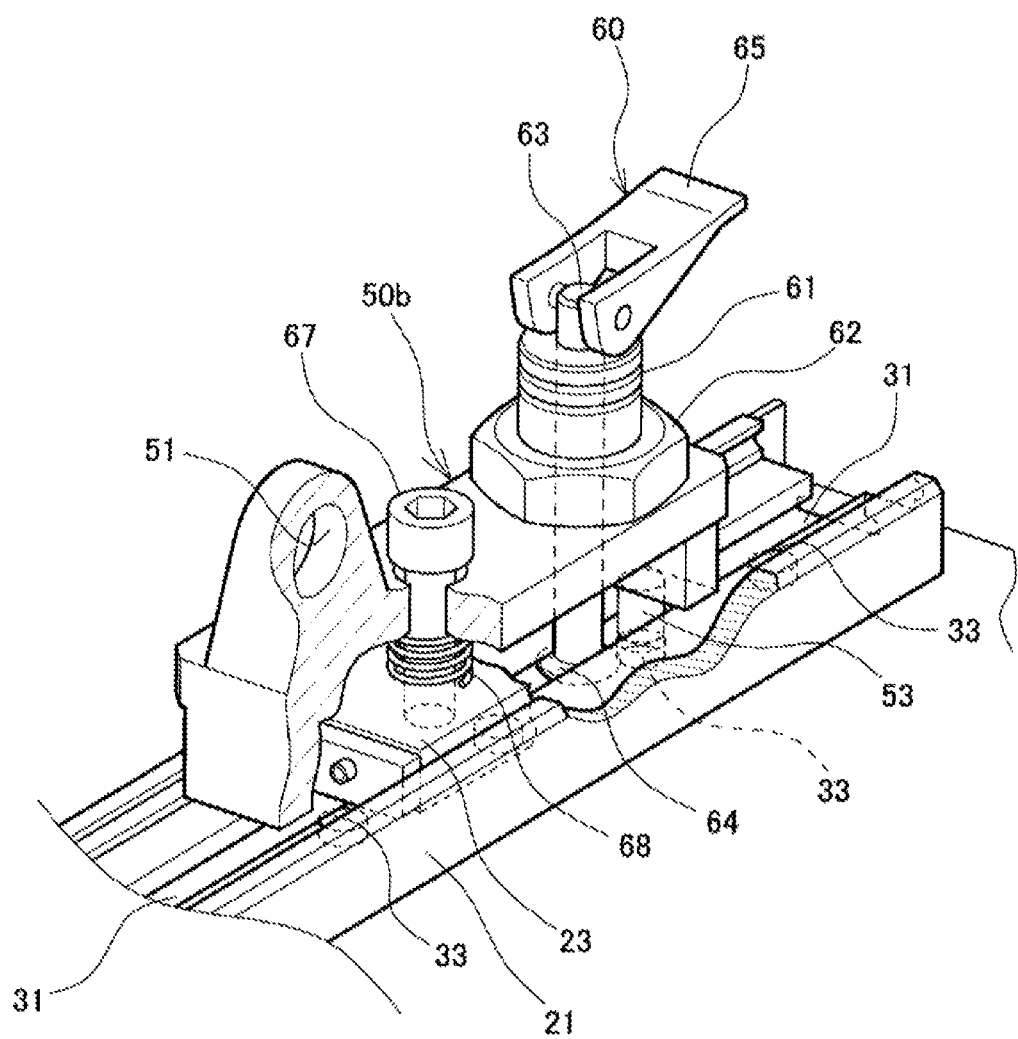
FIG. 9 is a vertical cross-sectional view illustrating a state in which binding between a leg part attachment member for the rear-side leg part and the flanged part is released in accordance with the first embodiment.
Figure 10:
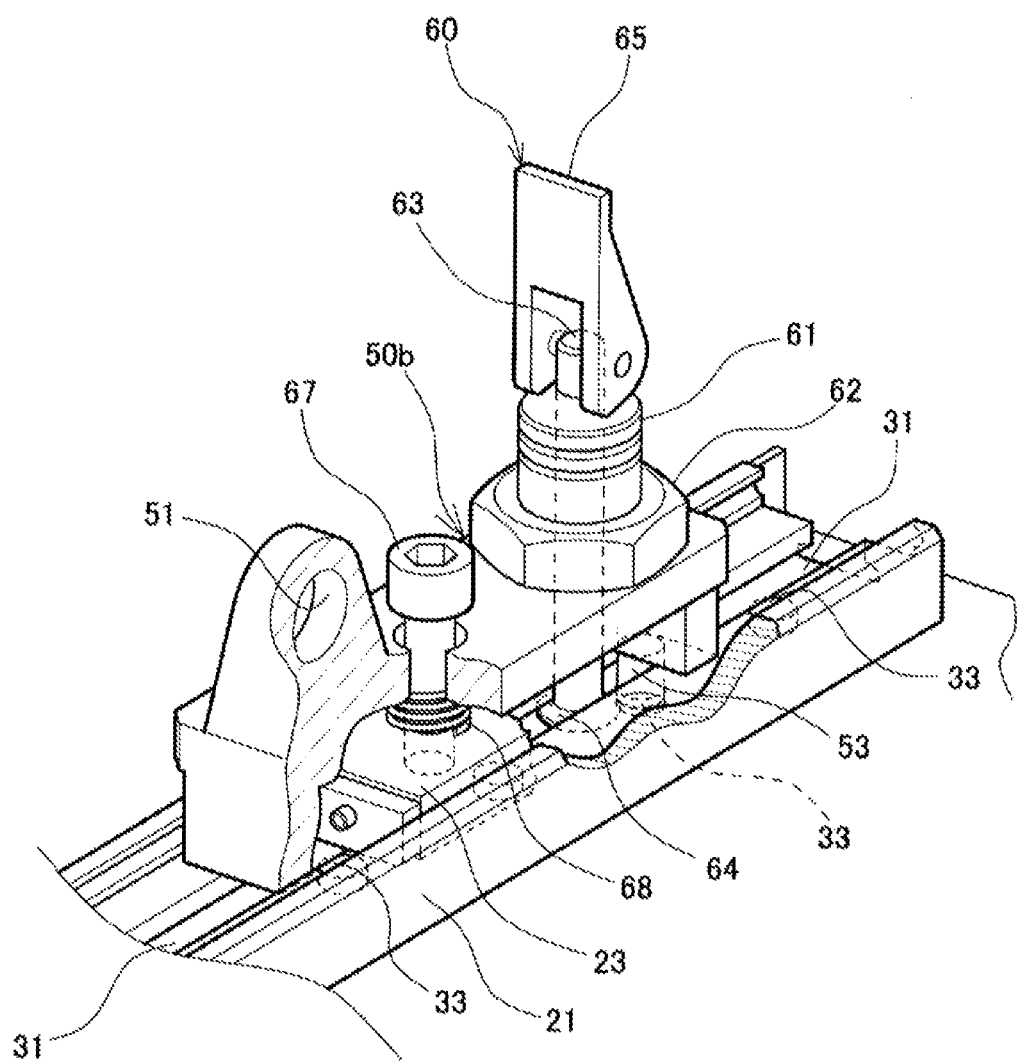
FIG. 10 is a vertical cross-sectional view illustrating a state in which the binding between the leg part attachment member for the rear-side leg part and the flanged part is carried out in accordance with the first embodiment.
Figure 12A:
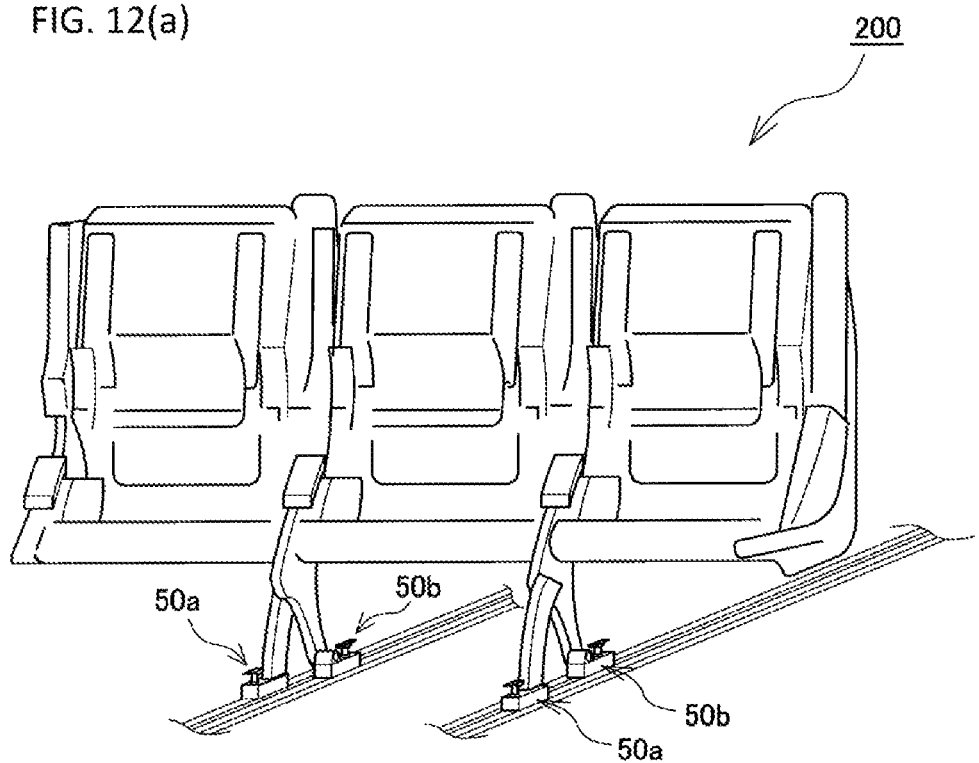
FIGS. 12(a) and 12(b) each illustrates a seat using the seat moving/securing device in accordance with the first embodiment.
Figure 12B:
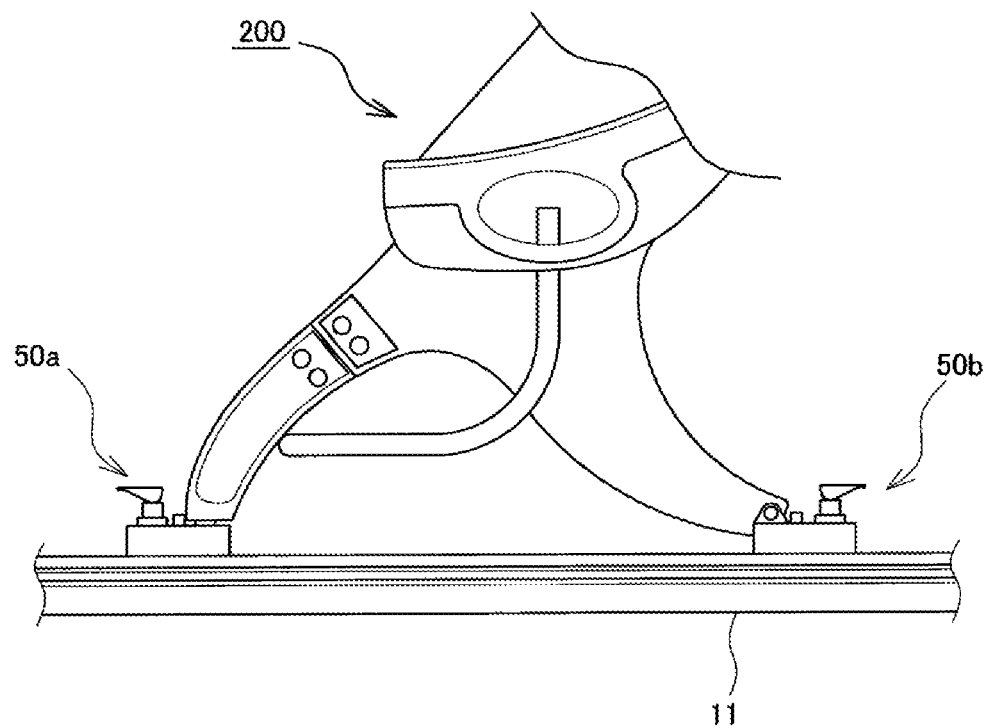

First, a configuration example of a seat moving/securing device 10 in accordance with a first embodiment will be described with reference to FIGS. 1 to 12(b). FIG. 1 is a perspective view illustrating a configuration example of a seat moving/securing device in accordance with the first embodiment, and FIG. 2 is a front view for describing the seat moving/securing device in accordance with the first embodiment. FIG. 3 is a perspective view illustrating a configuration example of a main part of the seat moving/securing device for a front-side leg part in accordance with the first embodiment, and FIG. 4 is a perspective view illustrating a configuration example of a main part of the seat moving/securing device for a rear-side leg part in accordance with the first embodiment. FIG. 5 is a partially broken perspective view illustrating a linear guide in accordance with the first embodiment. FIG. 6 is a vertical cross-sectional view illustrating a state in which binding between a leg part attachment member for the front-side leg part and a flanged part is released in accordance with the first embodiment, and FIG. 7 is a vertical cross-sectional view illustrating a state in which the binding between the leg part attachment member for the front-side leg part and the flanged part is carried out in accordance with the first embodiment. FIGS. 8(a) and 8(b) each illustrates binding and release states between the leg part attachment member for the front-side leg part and the flanged part in accordance with the first embodiment. FIG. 8(a) illustrates a state in which the binding state between the leg part attachment member for the front-side leg part and the flanged part is released in accordance with the first embodiment, and FIG. 8(b) illustrates a state in which the binding state between the leg part attachment member for the front-side leg part and the flanged part is carried out in accordance with the first embodiment. FIG. 9 is a vertical cross-sectional view illustrating a state in which binding between a leg part attachment member for the rear-side leg part and the flanged part is released in accordance with the first embodiment, and FIG. 10 is a vertical cross-sectional view illustrating a state in which the binding between the leg part attachment member for the rear-side leg part and the flanged part is carried out in accordance with the first embodiment. FIGS. 11(a) and 11(b) each illustrates binding and release states between the leg part attachment member for the rear-side leg part and the flanged part in accordance with the first embodiment. FIG. 11(a) illustrates a state in which the binding state between the leg part attachment member for the rear-side leg part and the flanged part is released in accordance with the first embodiment, and FIG. 11(b) illustrates a state in which the binding state between the leg part attachment member for the rear-side leg part and the flanged part is carried out in accordance with the first embodiment. FIGS. 12(a) and 12(b) each illustrates a seat using the seat moving/securing device in accordance with the first embodiment. FIG. 12(a) is a perspective view, and FIG. 12(b) is a side view illustrating a main part of the seat.

As illustrated in detail in FIGS. 1 and 2, the seat moving/securing device 10 in accordance with the first embodiment is configured to include a long reference member 11 extending in a longitudinal direction of a seat installation surface and securely installed, a leg part attachment member 50 having securely installed therein a leg part of a seat 200, a linear guide 20 attached between the long reference member 11 and the leg part attachment member 50 and enabling the leg part attachment member 50 to move horizontally along a longitudinal direction of the long reference member 11, and a locking mechanism 60 securely installed on the leg part attachment member 50.

The reference member 11 is a long member securely installed on the seat installation surface and a member serving as a reference of the seat moving/securing device 10 in accordance with the first embodiment. A cross-sectional shape of the reference member 11 is formed approximately in a U shape as illustrated in FIG. 2, and with an opened part of the approximately U-shaped member facing upward, mechanisms for a front-side leg part (for example, a leg part attachment member 50a and the locking mechanism 60) of the seat 200 and mechanisms for a rear-side leg part (for example, a leg part attachment member 50b and the locking mechanism 60) of the seat 200, described below, are arranged in parallel in an internal space of the approximately U-shaped member.

The leg part attachment member 50 is a member having securely installed therein the leg part of the seat 200 and, in the present embodiment, is configured to include the leg part attachment member 50a for the front-side leg part having securely installed therein a front leg of the seat 200 and the leg part attachment member 50b for the rear-side leg part having securely installed therein a rear leg of the seat 200. On the leg part attachment member 50 (50a and 50b), the below-mentioned locking mechanism 60 is securely installed.

Between the reference member 11 and the leg part attachment member 50 (50a and 50b), the linear guide 20 enabling the leg part attachment member 50 (50a and 50b) to move horizontally along the longitudinal direction of the long reference member 11 is installed. As illustrated in FIG. 5, the linear guide 20 in accordance with the present embodiment includes a track rail 21 serving as a track member and a moving block 23 serving as a moving member movably attached to the track rail 21 via a plurality of balls 22.

The track rail 21 is a long member having an approximately U-shaped cross-section, is provided on inner side surfaces thereof with load rolling grooves 21a each on the right and left sides enabling the balls 22 to be received in the grooves and formed over the entire length of the track rail 21, and is a track member of a type of a so-called outer rail. The track rail 21 is provided with a plurality of bolt attachment holes 21b appropriately spaced in a longitudinal direction thereof. The track rail 21 is secured on an upper surface of the reference member 11 by means of bolts (not illustrated) screwed in the plurality of bolt attachment holes 21b.

The moving block 23 is provided with two load rolling grooves 23a respectively opposed to the two load rolling grooves 21a each provided on the right and left sides of the track rail 21. The load rolling grooves 21a and 23a are combined to form two load rolling paths 25 between the track rail 21 and the moving block 23. The moving block 23 is also provided with two returning paths 26 extending to be parallel to the two load rolling paths 25. The moving block 23 further includes lid parts 28 on both end surfaces thereof, and not-illustrated ball guide grooves formed to cave in an arch-like manner in the lid part 28 cause direction change path 27 formed to project in an arch-like manner between the load rolling path 25 and the returning path 26 to be formed. The lid part 28 is reliably secured as a member serving as one end part of the moving block 23 to cause the direction change path 27 connecting the load rolling path 25 to the returning path 26 to be formed. The returning path 26 and the direction change paths 27 cause no-load rolling path 29 for the balls 22 to be formed, and the no-load rolling path 29 and the load rolling path 25 are combined to constitute endless circuit 30. With such a configuration, the plurality of balls 22 are installed in the endless circuit 30 to circulate endlessly, and the moving block 23 can reciprocate relatively to the track rail 21.

In the seat moving/securing device 10 in accordance with the first embodiment, the track rail 21 included in the linear guide 20 is provided with a catch-formed part 31 extending in the longitudinal direction and having a dovetail-groove-shaped cross-section (refer to FIGS. 2, 5, and the like). The catch-formed part 31 cooperates with the below-mentioned locking mechanism 60 to serve as a required component to exert a moving/securing function of the seat moving/securing device 10.

Next, referring to FIGS. 2, 3, 6 to 8(b), configurations of the leg part attachment member 50a and the locking mechanism 60 serving as mechanisms for the front-side leg part of the seat 200 will be described.

The leg part attachment member 50a in accordance with the first embodiment is a member having a gate-like external shape and arranged to stride over the moving block 23 of the linear guide 20. The leg part attachment member 50a and the moving block 23 of the linear guide 20 are connected at approximately center parts of the leg part attachment member 50a and the moving block 23 via a bush 67 having a buffering function and made of a soft material. Also, between the leg part attachment member 50a and the moving block 23 of the linear guide 20, a coil spring 68 serving as an elastic body and arranged to surround the bush 67 is installed. The coil spring 68 can exhibit a pressing force (elastic force). Accordingly, in a normal case in which the leg part attachment member 50*a* is not subject to an external force, a force is applied in directions in which the leg part attachment member 50*a* and the moving block 23 separate from each other due to the effect of the elastic force of the coil spring 68, and a state in which the leg part attachment member 50*a* is lifted upward with respect to the moving block 23 is thus maintained. Conversely, in a case in which the below-mentioned locking mechanism 60 acts to cause a downward pressing force to be applied to the leg part attachment member 50*a*, the leg part attachment member 50*a* moves in a direction toward the moving block 23 due to the effect of the downward pressing force against the effect of the elastic force of the coil spring 68, and a state in which the leg part attachment member 50*a* is pressed to the track rail 21 is maintained.

Also, the leg part attachment member 50*a* is provided with the locking mechanism 60. The locking mechanism 60 in accordance with the first embodiment is configured to include a rod housing 61 having a hollow hole and a rod member 63 serving as a shaft-like member provided to pass through the hollow hole included in the rod housing 61 and including on one end side thereof a flanged part 64 and including on the other end side thereof an operation lever part 65 formed in a cam shape.

The rod housing 61 is adapted to support and guide the rod member 63 and is integrally provided with a screw 62 adapted to connect the rod housing 61 to the leg part attachment member 50*a*. Due to the screw 62, the rod housing 61 is securely installed to the leg part attachment member 50*a* to disable movement.

The rod member 63 is a shaft-like member installed to pass through the hollow hole included in the rod housing 61 to enable up-and-down movement and includes the flanged part 64 on the lower end side. On the other hand, on the upper end side, the operation lever part 65 formed in a cam shape is installed to enable tilt movement. Here, the cam shape formed in the operation lever part 65 is configured to contact the upper end surface of the rod housing 61. Also, in the first embodiment, as illustrated in FIGS. 6 to 8(*b*), while the cam shape takes effect so that the projecting amount of an upper end part of the rod member 63 projecting from the upper end surface of the rod housing 61 may decrease when the operation lever part 65 is turned down into a laid state, the cam shape takes effect so that the projecting amount of the upper end part of the rod member 63 projecting from the upper end surface of the rod housing 61 may increase when the operation lever part 65 is turned up into an upright state. In other words, when the operation lever part 65 is turned down and tilted into the laid state, the projecting amount of the flanged part side of the rod member 63 projecting downward from the rod housing 61 increases, and the distance between the flanged part 64 and a bottom surface of the leg part attachment member 50*a* increases. When the operation lever part 65 is turned up and tilted into the upright state, the projecting amount of the flanged part side of the rod member 63 projecting downward from the rod housing 61 decreases, and the distance between the flanged part 64 and the bottom surface of the leg part attachment member 50*a* decreases.

Here, in the first embodiment, the rod housing 61 is securely installed to the leg part attachment member 50*a*, and the flanged part 64 included in the rod member 63 is installed to be inserted in the catch-formed part 31 having the dovetail-groove-shaped cross-section. Hence, due to the aforementioned effect of the cam shape included in the operation lever part 65, when the operation lever part 65 is turned down and tilted into the laid state, the projecting amount of the flanged part side of the rod member 63 projecting downward from the rod housing 61 increases, and the distance between the flanged part 64 and the bottom surface of the leg part attachment member 50*a* increases. Accordingly, the flanged part 64 moves inside the groove of the catch-formed part 31 in a direction toward a groove bottom, and the leg part attachment member 50*a* moves at an upper part of the groove of the catch-formed part 31 in a direction away from an entrance of the groove. Such a state is illustrated in FIG. 8(*a*), which means a binding state between the leg part attachment member 50*a* and the flanged part 64 pressing the neighborhood of the catch-formed part 31 is released. Conversely, when the operation lever part 65 is turned up and tilted into the upright state, the projecting amount of the flanged part side of the rod member 63 projecting downward from the rod housing 61 decreases, and the distance between the flanged part 64 and the bottom surface of the leg part attachment member 50*a* decreases. Accordingly, the flanged part 64 moves inside the groove of the catch-formed part 31 in a direction toward the entrance of the groove, and the leg part attachment member 50*a* moves in a direction approaching to the upper part of the entrance of the groove of the catch-formed part 31, that is, the neighborhood of a position in the track rail 21 provided with the catch-formed part 31. Thus, the flanged part 64 and the leg part attachment member 50*a* move in directions of interposing the entrance of the groove of the catch-formed part 31 therebetween from the inner part of the groove and the upper part of the groove and pressing each other. Such a state is illustrated in FIG. 8(*b*) in FIG. 8, which means the binding state between the leg part attachment member 50*a* and the flanged part 64 pressing the neighborhood of the catch-formed part 31 is carried out.

In the leg part attachment member 50*a* in accordance with the first embodiment, an attachment position of the bush 67 serving as a connection part of the leg part attachment member 50*a* to the moving block 23 is located approximately at a center part of the leg part attachment member 50*a*, and an attachment position of the aforementioned locking mechanism 60 is located at a one-sided position of the gate-like shape out of the center of the leg part attachment member 50*a*. Accordingly, the pressing force of pressing the neighborhood of the catch-formed part 31 generated by the effect of the locking mechanism 60 for bringing about the binding state between the leg part attachment member 50*a* and the flanged part 64 are applied to the one-sided position of the gate-like shape of the leg part attachment member 50*a*. This means that, in a case in which the bush 67 connecting the leg part attachment member 50*a* to the moving block 23 is a rigid body having no buffering function, worsening of an application balance of the pressing force may inhibit smooth binding/releasing operations. Under such circumferences, in the first embodiment, the bush 67 is made of a soft material having a buffering function. Since the bush 67 connecting the leg part attachment member 50*a* to the moving block 23 is made of a soft material having a buffering function to enable allowance to be provided between the leg part attachment member 50*a* and the moving block 23 in the binding state, securement and movement of the seat 200 by means of the seat moving/securing device 10 can be achieved suitably and easily.

Also, in the state in which the binding state between the leg part attachment member 50*a* and the flanged part 64 pressing the neighborhood of the catch-formed part 31 is carried out as illustrated in FIG. 8(*b*), an external force such as a force to be applied to the seat 200 is applied via a leg part attachment hole 51 formed in the leg part attachment member 50*a* to the rigid leg part attachment member 11, the track rail 21, and the reference member 11. Accordingly, in the first embodiment, when the leg part attachment member 50*a* and the flanged part 64 are in the binding state, no load such as the external force will be applied to the linear guide 20 and the like acting to exhibit the moving force. Conversely, in the state in which the binding state between the leg part attachment member 50*a* and the flanged part 64 pressing the neighborhood of the catch-formed part 31 is released as illustrated in FIG. 8(*a*), the moving force of moving the seat 200 is smoothly transmitted by the linear guide 20. Consequently, in the device configuration of the seat moving/securing device 10 in accordance with the first embodiment, stable moving/securing operations can be achieved, and long duration of the device is also achieved.

Next, referring to FIGS. 2, 4, 9 to 11(*b*), configurations of the leg part attachment member 50*b* and the locking mechanism 60 serving as mechanisms for the rear-side leg part of the seat 200 will be described.

The leg part attachment member 50*b* in accordance with the first embodiment is a member having a gate-like external shape and arranged to stride over the moving block 23 of the linear guide 20. The leg part attachment member 50*b* and the moving block 23 of the linear guide 20 are connected at approximately center parts of the leg part attachment member 50*b* and the moving block 23 via the bush 67 having a buffering function and made of a soft material. Also, between the leg part attachment member 50*b* and the moving block 23 of the linear guide 20, the coil spring 68 serving as an elastic body and arranged to surround the bush 67 is installed. The coil spring 68 can exhibit a pressing force (elastic force). Accordingly, in a normal case in which the leg part attachment member 50*b* is not subject to an external force, a force is applied in a direction in which the leg part attachment member 50*b* and the moving block 23 separate from each other due to the effect of the elastic force of the coil spring 68, and a state in which the leg part attachment member 50*b* is lifted upward with respect to the moving block 23 is thus maintained. Conversely, in a case in which the below-mentioned locking mechanism 60 acts to cause a downward pressing force to be applied to the leg part attachment member 50*b*, the leg part attachment member 50*b* moves in a direction toward the moving block 23 due to the effect of the downward pressing force against the effect of the elastic force of the coil spring 68, and a state in which the leg part attachment member 50*b* is pressed to the track rail 21 is maintained.

Also, the leg part attachment member 50*b* is provided with the locking mechanism 60. The locking mechanism 60 in accordance with the first embodiment is configured to include the rod housing 61 having a hollow hole and the rod member 63 serving as a shaft-like member provided to pass through the hollow hole included in the rod housing 61 and including on one end side thereof the flanged part 64 and including on the other end side thereof the operation lever part 65 formed in a cam shape.

The rod housing 61 is adapted to support and guide the rod member 63 and is integrally provided with the screw 62 adapted to connect the rod housing 61 to the leg part attachment member 50*b*. Due to the screw 62, the rod housing 61 is securely installed to the leg part attachment member 50*b* to disable movement.

The rod member 63 is a shaft-like member installed to pass through the hollow hole included in the rod housing 61 to enable up-and-down movement and includes the flanged part 64 on the lower end side. On the other hand, on the upper end side, the operation lever part 65 formed in a cam shape is installed to enable tilt movement. Here, the cam shape formed in the operation lever part 65 is configured to contact the upper end surface of the rod housing 61. Also, in the first embodiment, as illustrated in FIGS. 9 to 11(*b*), when the operation lever part 65 is turned down and tilted into a laid state, the projecting amount of the flanged part side of the rod member 63 projecting downward from the rod housing 61 increases, and the distance between the flanged part 64 and a bottom surface of the leg part attachment member 50*b* increases. When the operation lever part 65 is turned up and tilted into an upright state, the projecting amount of the flanged part side of the rod member 63 projecting downward from the rod housing 61 decreases, and the distance between the flanged part 64 and the bottom surface of the leg part attachment member 50*b* decreases.

Here, in the first embodiment, the rod housing 61 is securely installed to the leg part attachment member 50*b*, and the flanged part 64 included in the rod member 63 is installed to be inserted in the catch-formed part 31 having the dovetail-groove-shaped cross-section. Hence, due to the aforementioned effect of the cam shape included in the operation lever part 65, when the operation lever part 65 is turned down and tilted into the laid state, the projecting amount of the flanged part side of the rod member 63 projecting downward from the rod housing 61 increases, and the distance between the flanged part 64 and the bottom surface of the leg part attachment member 50*b* increases. Accordingly, the flanged part 64 moves inside the groove of the catch-formed part 31 in a direction toward a groove bottom, and the leg part attachment member 50*b* moves at an upper part of the groove of the catch-formed part 31 in a direction away from an entrance of the groove. Such a state is illustrated in FIG. 11(*a*), which means a binding state between the leg part attachment member 50*b* and the flanged part 64 pressing the neighborhood of the catch-formed part 31 is released. Conversely, when the operation lever part 65 is turned up and tilted into the upright state, the projecting amount of the flanged part side of the rod member 63 projecting downward from the rod housing 61 decreases, and the distance between the flanged part 64 and the bottom surface of the leg part attachment member 50*b* decreases. Accordingly, the flanged part 64 moves inside the groove of the catch-formed part 31 in a direction toward the entrance of the groove, and the leg part attachment member 50*b* moves in a direction approaching to the upper part of the entrance of the groove of the catch-formed part 31, that is, the neighborhood of a position in the track rail 21 provided with the catch-formed part 31. Thus, the flanged part 64 and the leg part attachment member 50*b* move in directions of interposing the entrance of the groove of the catch-formed part 31 therebetween from the inner part of the groove and the upper part of the groove and pressing each other. Such a state is illustrated in FIG. 11(*b*), which means the binding state between the leg part attachment member 50*b* and the flanged part 64 pressing the neighborhood of the catch-formed part 31 is carried out.

Further, as for the leg part attachment member 50*b* in accordance with the first embodiment, as illustrated further in detail in FIG. 10 and the like, a pin-formed part 53 for positioning is formed on an opposed surface side of the leg part attachment member 50*b* to the track rail 21. On the other hand, on an opposed surface side of the track rail 21 included in the linear guide 20 to the leg part attachment member 50*b*, a plurality of positioning holes 33 enabling the pin-formed part 53 included in the leg part attachment member 50*b* to be fitted therein are formed at predetermined intervals. The positioning holes 33 in accordance with the first embodiment are formed on a center bottom surface of the catch-formed part 31 having the dovetail-groove-shaped cross-section at regular intervals such as at one-inch pitches. By fitting the pin-formed part 53 into the positioning hole 33, positioning of the leg part attachment member 50b can be performed. That is, with use of the pin-formed part 53 and the positioning hole 33, positioning of the seat 200 attached to the leg part attachment member 50b can be performed accurately and easily.

As described above, in a normal case in which the leg part attachment member 50b is not subject to an external force, a force is applied in a direction in which the leg part attachment member 50b and the moving block 23 separate from each other due to the effect of the elastic force of the coil spring 68, and a state in which the leg part attachment member 50b is lifted upward with respect to the moving block 23 is thus maintained. In this case, fitting between the pin-formed part 53 and the positioning hole 33 is released due to the effect of the elastic force of the coil spring 68, and a state illustrated in FIG. 9 is maintained.

Under such a state in which the seat 200 can move, when an external force for movement is applied to the seat 200, the leg part attachment member 50b connected to the seat 200 moves along the track rail 21 due to the effect of the linear guide 20. At this time, by moving the seat 200 while pressing the leg part attachment member 50b slightly downward, a position to allow the pin-formed part 53 and the positioning hole 33 to be fitted with each other, that is, one of the one-inch-pitch positions for positioning the seat 200, can be searched. When a desired seat positioning position is determined, the locking mechanism 60 is made to function to cause the leg part attachment member 50b to exhibit a downward pressing force. Due to the effect of the downward pressing force against the effect of the elastic force of the coil spring 68, the leg part attachment member 50b moves in a direction toward the track rail 21 (moving block 23), and the pin-formed part 53 and the positioning hole 33 are fitted and positioned. Also, the leg part attachment member 50b is pressed to the track rail 21, and the binding state between the leg part attachment member 50b and the flanged part 64 pressing the neighborhood of the catch-formed part 31 is carried out.

In the leg part attachment member 50b in accordance with the first embodiment, an attachment position of the bush 67 serving as a connection part of the leg part attachment member 50b to the moving block 23 is located approximately at a center part of the leg part attachment member 50b, and an attachment position of the aforementioned locking mechanism 60 is located at a one-sided position of the gate-like shape out of the center of the leg part attachment member 50b. Accordingly, the pressing force of pressing the neighborhood of the catch-formed part 31 generated by the effect of the locking mechanism 60 for bringing about the binding state between the leg part attachment member 50b and the flanged part 64 are applied to the one-sided position of the gate-like shape of the leg part attachment member 50b. This means that, in a case in which the bush 67 connecting the leg part attachment member 50b to the moving block 23 is a rigid body having no buffering function, worsening of an application balance of the pressing force may inhibit smooth binding/releasing operations. Under such circumferences, in the first embodiment, the bush 67 is made of a soft material having a buffering function. Since the bush 67 connecting the leg part attachment member 50b to the moving block 23 is made of a soft material having a buffering function to enable allowance to be provided between the leg part attachment member 50b and the moving block 23 in the binding state, securement and movement of the seat 200 by means of the seat moving/securing device 10 can be achieved suitably and easily.

Also, in the state in which the binding state between the leg part attachment member 50b and the flanged part 64 pressing the neighborhood of the catch-formed part 31 is carried out as illustrated in FIG. 11(b), an external force such as a force to be applied to the seat 200 is applied via the leg part attachment hole 51 formed in the leg part attachment member 50b to the rigid leg part attachment member 50b, the track rail 21, and the reference member 11. Accordingly, in the first embodiment, when the leg part attachment member 50b and the flanged part 64 are in the binding state, no load such as the external force will be applied to the linear guide 20 and the like acting to exhibit the moving force. Also, since the binding state between the leg part attachment member 50b and the flanged part 64 pressing the neighborhood of the catch-formed part 31 obtained when the locking mechanism 60 functions achieves a remarkably stable securing state, a force breaking the pin-formed part 53 such as a horizontal force will not be applied even in the state in which the pin-formed part 53 and the positioning hole 33 are fitted. Conversely, in the state in which the binding state between the leg part attachment member 50b and the flanged part 64 pressing the neighborhood of the catch-formed part 31 is released as illustrated in FIG. 11(a), fitting between the pin-formed part 53 and the positioning hole 33 is also released, and the moving force of moving the seat 200 is smoothly transmitted by the linear guide 20. Consequently, in the device configuration of the seat moving/securing device 10 in accordance with the first embodiment, stable moving/securing operations can be achieved, and long duration of the device is also achieved.

Additionally, as described above, the pin-formed part 53 for positioning is formed only in the leg part attachment member 50b for the rear-side leg part of the seat 200 and is not formed in the leg part attachment member 50a for the front-side leg part of the seat 200. Such a configuration is employed in consideration of the fact that providing both the front and rear leg parts of the seat 200 with the positioning functions may make it difficult to perform stable and reliable positioning due to a formation error of the positioning hole 33, an error of the device, and the like. The fitting between the pin-formed part 53 and the positioning hole 33 for positioning of the seat 200 may be provided either on the front side or on the rear side. Thus, although the pin-formed part 53 for positioning is formed only in the leg part attachment member 50b for the rear-side leg part of the seat 200 in the aforementioned first embodiment, the pin-formed part 53 may be formed only in the leg part attachment member 50a for the front-side leg part of the seat 200.

The seat moving/securing device 10 in accordance with the first embodiment has been described above. With the seat moving/securing device 10 in accordance with the first embodiment, the leg part attachment members 50a and 50b can receive a downward force (that is, a force in a radial direction), the flanged part 64 can receive an upward force (that is, a force in an inverse radial direction), and the pin-formed part 53 can exert functions of positioning and as a brake against a moving force in the front-and-rear direction (that is, a force in a sliding direction). Since the seat moving/securing device 10 in accordance with the first embodiment can exert such functions, when no person sits on the seat 200, and the binding state of the device is released, the linear guide 20 functions for smooth slide movement. Conversely, when a person sits on the seat 200, and the binding state of the device is exercised, the leg part attachment members 50*a* and 50*b* and the flanged part 64 can cooperate with each other to receive external load to be applied to the seat 200, namely, the forces in the radial and inverse radial directions. That is, in the first embodiment, size reduction of the linear guide 20 is achieved since the linear guide 20 does not need to receive the external load and has only to function for slide movement. This effect works especially in an aircraft field. In a case of the seat 200 of an aircraft, assumed is a situation in which the seat 200 under certain load is subject to high acceleration of several G. To design the device withstanding such a situation, the linear guide generally has to be enlarged. However, with the seat moving/securing device 10 in accordance with the first embodiment, since the linear guide 20 does not need to receive the external load, size reduction of the linear guide 20 can be achieved, which causes the device to be compact.

The seat moving/securing device 10 in accordance with the first embodiment described above can be used, for example, by installing the seat 200 of an aircraft on the seat moving/securing device 10 as illustrated in FIGS. 12(*a*) and 12(*b*). Specifically, the front leg of the seat 200 is secured to the leg part attachment hole 51 formed in the leg part attachment member 50*a* for the front-side leg part of the seat 200 by means of a known fastening means such as a bolt, and the rear leg of the seat 200 is secured to the leg part attachment hole 51 formed in the leg part attachment member 50*b* for the rear-side leg part of the seat 200 by means of a known fastening means such as a bolt, to complete attachment of the seat 200 to the seat moving/securing device 10. Subsequently, as described above, the operation lever part 65 is turned down and tilted into the laid state to cause the binding state to be released. By applying a force to the seat 200 in the front-and-rear direction, the seat 200 can be moved. Further, by moving the seat 200 while pressing the leg part attachment member 50*b* slightly downward, a position to allow the pin-formed part 53 and the positioning hole 33 to be fitted with each other, that is, one of the one-inch-pitch positions for positioning the seat 200, can be searched. When a positioning position for the seat 200 is determined, the operation lever part 65 is turned up and tilted into the upright state at the position to cause the seat 200 to be positioned and the binding state to be carried out. By performing such operations, the seat 200 can be moved and secured easily and quickly. That is, in accordance with the first embodiment, it is possible to provide the seat moving/securing device 10 enabling the seat 200 to be moved and secured easily and quickly.

The first embodiment as an example to which the present invention is preferably applied has been described above. Next, a seat moving/securing device 100 in accordance with a second embodiment, which differs from the first embodiment, will be described with reference to FIGS. 13 to 20(*b*).

[Seat Moving/Securing Device 100 in Accordance with Second Embodiment]

Figure 13:
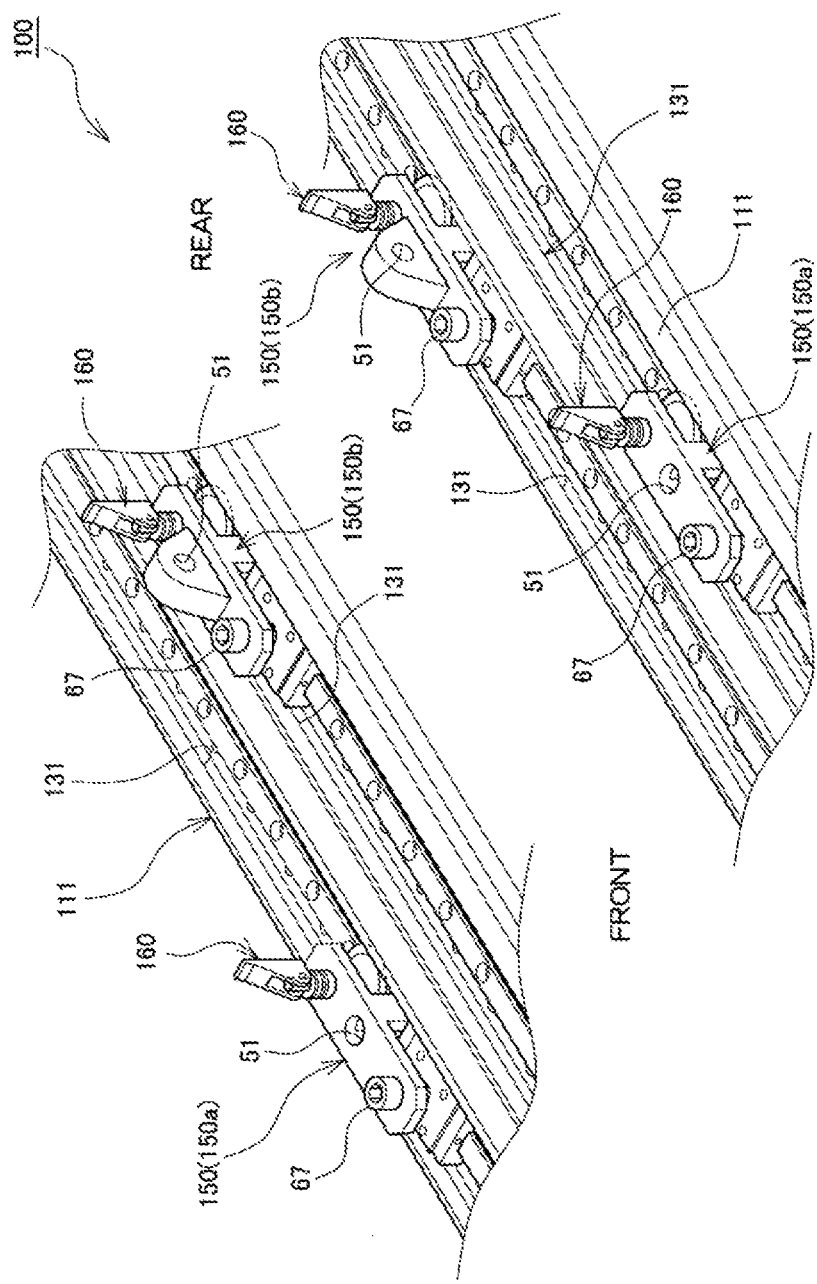
FIG. 13 is a perspective view illustrating a configuration example of a seat moving/securing device in accordance with a second embodiment FIGS. 14(a) and 14(b) each describes the seat moving/securing device in accordance with the second embodiment.
Figure 14A:
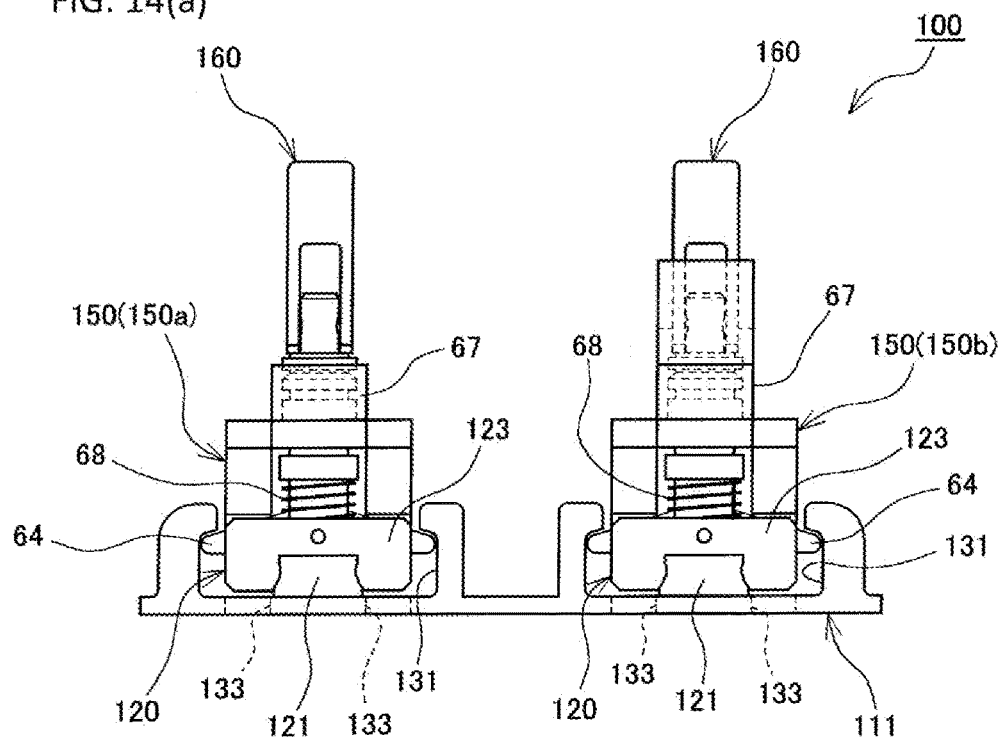
FIG. 14(a) is a front view of the seat moving/securing device in accordance with the second embodiment.
Figure 14B:
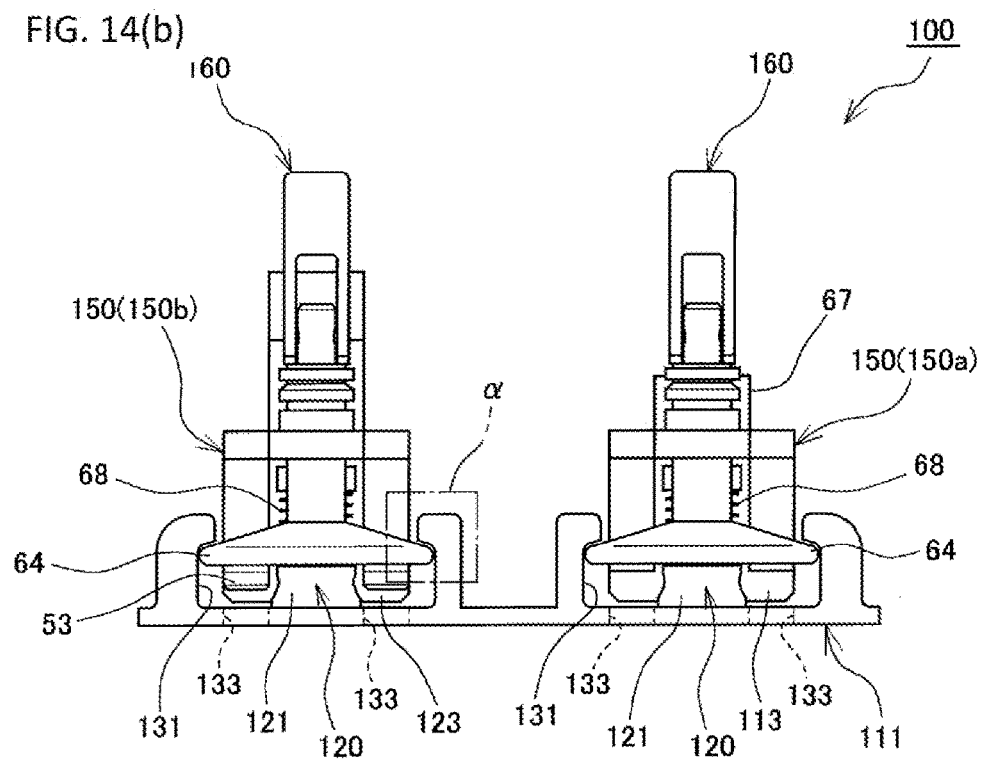
FIG. 14(b) is a rear view of the seat moving/securing device in accordance with the second embodiment.
Figure 15:
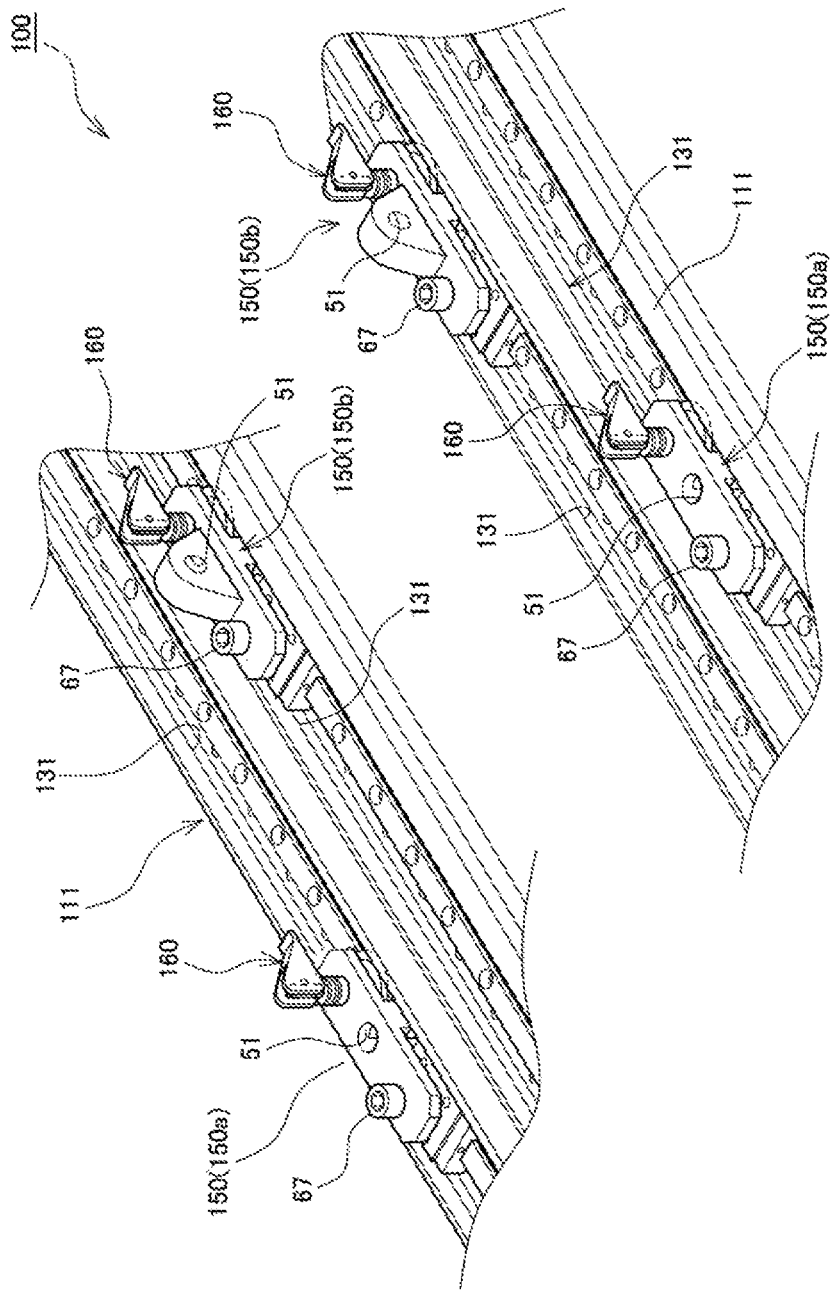
FIG. 15 is a perspective view illustrating a state in which binding between a leg part attachment member and a flanged part of the seat moving/securing device is carried out in accordance with the second embodiment.
Figure 17:
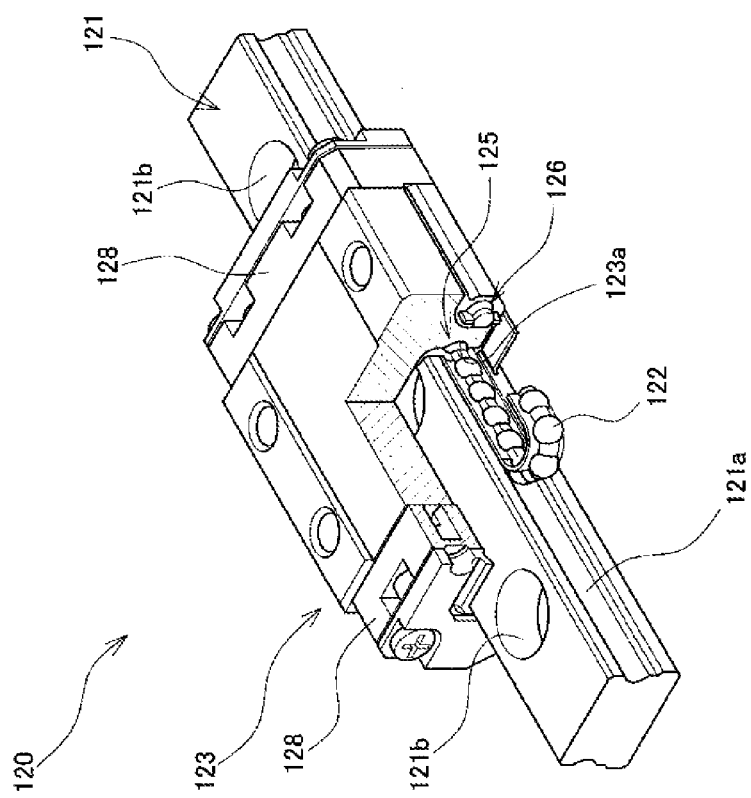
FIG. 17 is a partially broken perspective view illustrating a linear guide in accordance with the second embodiment.
Figure 18A:
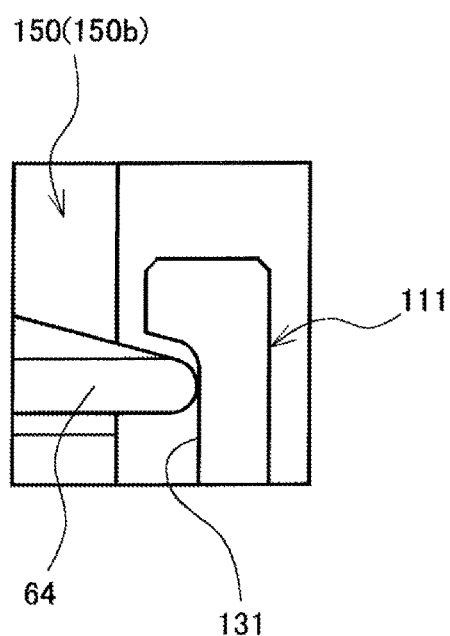
FIGS. 18(a) and 18(b) each illustrates binding and release states between the leg part attachment member and the flanged part in accordance with the second embodiment.
Figure 18B:
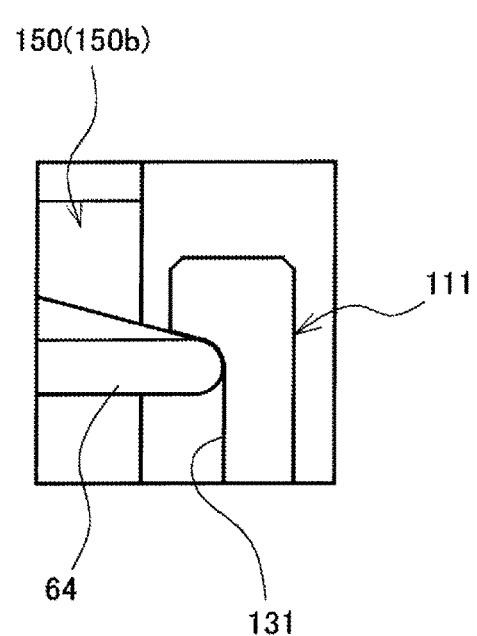

FIG. 13 is a perspective view illustrating a configuration example of a seat moving/securing device in accordance with a second embodiment. FIGS. 14(*a*) and 14(*b*) each describes the seat moving/securing device in accordance with the second embodiment. FIG. 14(*a*) is a front view of the seat moving/securing device in accordance with the second embodiment, and FIG. 14(*b*) is a rear view of the seat moving/securing device in accordance with the second embodiment. FIG. 15 is a perspective view illustrating a state in which binding between a leg part attachment member and a flanged part of the seat moving/securing device is carried out in accordance with the second embodiment. FIGS. 16(*a*) and 16(*b*) each illustrates a state in which the binding between the leg part attachment member and the flanged part is carried out in accordance with the second embodiment. FIG. 16(*a*) is a front view illustrating a state in which the binding between the leg part attachment member and the flanged part is carried out in accordance with the second embodiment, and FIG. 16(*b*) is a rear view illustrating a state in which the binding between the leg part attachment member and the flanged part is carried out in accordance with the second embodiment. FIG. 17 is a partially broken perspective view illustrating a linear guide in accordance with the second embodiment. FIGS. 18(*a*) and 18(*b*) each illustrates binding and release states between the leg part attachment member and the flanged part in accordance with the second embodiment. FIG. 18(*a*) is an enlarged view of a main part (a part labeled with reference numeral α in FIG. 14(*b*)) illustrating a state in which the binding state between the leg part attachment member and the flanged part is released in accordance with the second embodiment, and FIG. 18(*b*) is an enlarged view of a main part (a part labeled with reference numeral β in FIG. 16(*b*)) illustrating a state in which the binding state between the leg part attachment member and the flanged part is carried out in accordance with the second embodiment. FIGS. 19(*a*) and 19(*b*) each illustrates the binding state between the leg part attachment member for a front-side leg part and the flanged part in accordance with the second embodiment. FIG. 19(*a*) is a vertical cross-sectional view illustrating a state in which the binding state between the leg part attachment member for the front-side leg part and the flanged part is released in accordance with the second embodiment, and FIG. 19(*b*) is a vertical cross-sectional view illustrating a state in which the binding state between the leg part attachment member for the front-side leg part and the flanged part is carried out in accordance with the second embodiment. FIGS. 20(*a*) and 20(*b*) each illustrates the binding state between the leg part attachment member for a rear-side leg part and the flanged part in accordance with the second embodiment. FIG. 20(*a*) is a vertical cross-sectional view illustrating a state in which the binding state between the leg part attachment member for the rear-side leg part and the flanged part is released in accordance with the second embodiment, and FIG. 20(*b*) is a vertical cross-sectional view illustrating a state in which the binding state between the leg part attachment member for the rear-side leg part and the flanged part is carried out in accordance with the second embodiment. It is to be noted that, in a seat moving/securing device 100 in accordance with the second embodiment described below, similar or identical components to those in the first embodiment are shown with the same reference numerals, and description of the duplicate components may be omitted.

In the aforementioned seat moving/securing device 10 in accordance with the first embodiment, the case in which the catch-formed part 31 extending in the longitudinal direction and having a dovetail-groove-shaped cross-section is formed in the track rail 21 included in the linear guide 20 has been illustrated and described. However, in the present invention, the catch-formed part having a dovetail-groove-shaped cross-section can be formed in a long reference member. A catch-formed part 131 in accordance with the second embodiment is illustrated in detail in FIGS. 13 to 16(*b*) and the like.

As illustrated in detail in FIGS. 13 to 16(*b*), the seat moving/securing device 100 in accordance with the second embodiment is configured to include a long reference member 111 extending in a longitudinal direction of a seat installation surface and securely installed, a leg part attachment member 150 having securely installed therein a leg part of the seat 200, a linear guide 120 attached between the long reference member 111 and the leg part attachment member 150 and enabling the leg part attachment member 150 to move horizontally along a longitudinal direction of the long reference member 111, and a locking mechanism 160 securely installed on the leg part attachment member 150.

The reference member 111 is a long member securely installed on the seat installation surface and a member serving as a reference of the seat moving/securing device 100 in accordance with the second embodiment. In a cross-sectional shape of the reference member 111, wall parts each formed approximately in an L shape for forming the catch-formed part 131 extending in the longitudinal direction and having a dovetail-groove-shaped cross-section are formed to erect as illustrated in FIGS. 13 to 16(b). In the second embodiment, a configuration of forming two catch-formed parts 131 in one reference member 111 is illustrated. One of the two catch-formed parts 131 is for a front-side leg part of the seat 200 while the other is for a rear-side leg part of the seat 200. The catch-formed part 131 cooperates with the below-mentioned locking mechanism 160 to serve as a required component to exert a moving/securing function of the seat moving/securing device 100. In the two catch-formed parts 131, mechanisms for the front-side leg part (for example, a leg part attachment member 150a and the locking mechanism 160) of the seat 200 and mechanisms for the rear-side leg part (for example, a leg part attachment member 150b and the locking mechanism 160) of the seat 200, described below, are arranged, respectively.

The leg part attachment member 150 is a member having securely installed therein the leg part of the seat 200 and, in the present embodiment, is configured to include the leg part attachment member 150a for the front-side leg part having securely installed therein a front leg of the seat 200 and the leg part attachment member 150b for the rear-side leg part having securely installed therein a rear leg of the seat 200. On the leg part attachment member 150 (150a and 150b), the below-mentioned locking mechanism 160 is securely installed.

Between the reference member 111 and the leg part attachment member 150 (150a and 150b), the linear guide 120 enabling the leg part attachment member 150 (150a and 150b) to move horizontally along the longitudinal direction of the long reference member 111 is installed. As illustrated in FIG. 17, the linear guide 120 in accordance with the present embodiment includes a track rail 121 serving as a track member and a moving block 123 serving as a moving member movably attached to the track rail 121 via a plurality of balls 122.

The track rail 121 is a long member having an approximately rectangular cross-section and is provided on outer circumferential side surfaces thereof with load rolling grooves 121a each on the right and left sides enabling the balls 122 to be received in the grooves and formed over the entire length of the track rail 121. The track rail 121 is provided with a plurality of bolt attachment holes 121b appropriately spaced in a longitudinal direction thereof. The track rail 121 is secured in the catch-formed part 131 formed in the reference member 111 by means of bolts (not illustrated) screwed in the plurality of bolt attachment holes 121b.

The moving block 123 is provided with two load rolling grooves 123a respectively opposed to the two load rolling grooves 121a each provided on the right and left sides of the track rail 121. The load rolling grooves 121a and 123a are combined to form two load rolling paths 125 between the track rail 121 and the moving block 123. The moving block 123 is also provided with two returning paths 126 extending to be parallel to the two load rolling paths 125. The moving block 123 further includes lid parts 128 on both end surfaces thereof, and not-illustrated ball guide groove formed to cave in an arch-like manner in the lid part 128 causes direction change path (not illustrated) formed to project in an arch-like manner between the load rolling path 125 and the returning path 126 to be formed. The lid part 128 is reliably secured as a member serving as one end part of the moving block 123 to cause the direction change path (not illustrated) connecting the load rolling path 125 to the returning path 126 to be formed. The returning path 126 and the direction change paths (not illustrated) cause no-load rolling paths for the balls 122 to be formed, and the no-load rolling path and the load rolling path 125 are combined to constitute endless circuit. With such a configuration, the plurality of balls 122 are installed in the endless circuit to circulate endlessly, and the moving block 123 can reciprocate relatively to the track rail 121.

Next, referring to FIGS. 13 to 201, configurations of each of the leg part attachment members 150 (150a and 150b) and the locking mechanism 160 will be described.

Each of the leg part attachment members 150a and 150b in accordance with the second embodiment is a member having an approximately T external shape in a side view and arranged so that an umbrella part on one side of the approximately T shape may cover the moving block 123 of the linear guide 120. Each of the leg part attachment members 150a and 150b and the moving block 123 of the linear guide 120 are connected at an end part of each of the leg part attachment members 150a and 150b and an approximately center part of the moving block 123 via the bush 67 having a buffering function and made of a soft material. Also, between each of the leg part attachment members 150a and 150b and the moving block 123 of the linear guide 120, the coil spring 68 serving as an elastic body and arranged to surround the bush 67 is installed. The coil spring 68 can exhibit a pressing force (elastic force). Accordingly, in a normal case in which each of the leg part attachment members 150a and 150b is not subject to an external force, forces are applied in directions in which each of the leg part attachment members 150a and 150b and the moving block 123 separate from each other due to the effect of the elastic force of the coil spring 68, and a state in which each of the leg part attachment members 150a and 150b is lifted upward with respect to the moving block 123 is thus maintained. Conversely, in a case in which the below-mentioned locking mechanism 160 acts to cause a downward pressing force to be applied to each of the leg part attachment members 150a and 150b, each of the leg part attachment members 150a and 150b moves in a direction toward the moving block 123 due to the effect of the downward pressing force against the effect of the elastic force of the coil spring 68, and a state in which each of the leg part attachment members 150a and 150b is pressed to the reference member 111 is maintained.

Also, each of the leg part attachment members 150a and 150b is provided with the locking mechanism 160. The locking mechanism 160 in accordance with the second embodiment is configured to include the rod housing 61 having a hollow hole and the rod member 63 serving as a shaft-like member provided to pass through the hollow hole included in the rod housing 61 and including on one end side thereof the flanged part 64 and including on the other end side thereof the operation lever part 65 formed in a cam shape.

Since the locking mechanism 160 in accordance with the second embodiment has a substantially similar structure to that of the aforementioned locking mechanism 60 in accordance with the first embodiment, detailed description of the locking mechanism 160 will be omitted. The locking mechanism 160 in accordance with the second embodiment differs from the locking mechanism 60 in accordance with the first embodiment in that the cam shape formed in the operation lever part 65 is different. That is, as illustrated in FIGS. 19(*a*), 19(*b*), 20(*a*), 20(*b*), and the like, in a case of the second embodiment, binding is released when the operation lever part 65 is turned up and tilted into an upright state, and the binding is carried out when the operation lever part 65 is turned down and tilted into a laid state. In other words, in the case of the second embodiment, when the operation lever part 65 is turned up and tilted into the upright state as illustrated in FIGS. 14(*a*) and 14(*b*), the projecting amount of the flanged part side of the rod member 63 projecting downward from the rod housing 61 increases, and the distance between the flanged part 64 and a bottom surface of each of the leg part attachment members 150*a* and 150*b* decreases. When the operation lever part 65 is turned down and tilted into the laid state as illustrated in FIGS. 16(*a*) and 16(*b*), the projecting amount of the flanged part side of the rod member 63 projecting downward from the rod housing 61 decreases, and the distance between the flanged part 64 and the bottom surface of each of the leg part attachment members 150*a* and 150*b* increases.

In the second embodiment, the flanged part 64 included in the rod member 63 is inserted and installed in the catch-formed part 131 having the dovetail-groove-shaped cross-section, and a front view (rear view) of each of the leg part attachment members 150*a* and 150*b* having an approximately T external shape in a side view is an approximately n shape and a gate-like shape having long legs. Thus, as illustrated in FIGS. 14(*a*) and 14(*b*), when the distance between the flanged part 64 and the bottom surface of each of the leg part attachment members 150*a* and 150*b* decreases, the pressing forces of the flanged part 64 and each of the leg part attachment members 150*a* and 150*b* from the inside to the outside of the catch-formed part 131 are released, which brings about a state in which the binding is released (refer to FIG. 18(*a*) as well). Conversely, as illustrated in FIGS. 16(*a*) and 16(*b*), when the distance between the flanged part 64 and the bottom surface of each of the leg part attachment members 150*a* and 150*b* increases, the pressing forces of the flanged part 64 and each of the leg part attachment members 150*a* and 150*b* from the inside to the outside of the catch-formed part 131 are exhibited on the catch-formed part 131, which brings about a state in which the binding is carried out (refer to FIG. 18(*b*) as well).

That is, due to the effect of the cam shape formed in the operation lever part 65, when the operation lever part 65 is turned up and tilted into the upright state, the projecting amount of the flanged part side of the rod member 63 projecting downward from the rod housing 61 increases, the distance between the flanged part 64 and the bottom surface of each of the leg part attachment members 150*a* and 150*b* decreases, and both the members 150 (150*a* and 150*b*) and 64 thus release pressing against the catch-formed part 131. Such a state is a state illustrated in FIGS. 14(*a*) and 14(*b*). Each of the leg part attachment members 150*a* and 150*b* and the flanged part 64 pressing the inner wall surface of the catch-formed part 131 respectively move away from the inner wall surface of the catch-formed part 131 inward to cause the binding state to be released (refer to FIG. 18(*a*) as well). Conversely, when the operation lever part 65 is turned down and tilted into the laid state, the projecting amount of the flanged part side of the rod member 63 projecting downward from the rod housing 61 decreases, the distance between the flanged part 64 and the bottom surface of each of the leg part attachment members 150*a* and 150*b* increases, and both the members 150 (150*a* and 150*b*) and 64 thus move in reverse directions from each other to press the inner wall surface of the catch-formed part 131 outward. Such a state is a state illustrated in FIGS. 16(*a*) and 16(*b*). The binding state between each of the leg part attachment members 150*a* and 150*b* and the flanged part 64 pressing the inner wall surface of the catch-formed part 131 is carried out (refer to FIG. 18(*b*) as well).

The function of the bush 67 made of a soft material having a buffering function and the function of the linear guide 120 acting to exhibit the moving force are similar to those in the aforementioned first embodiment. Consequently, it can be stated that, in the device configuration of the seat moving/securing device 100 in accordance with the second embodiment, stable moving/securing operations can be achieved, and long duration of the device is also achieved.

Also, similarly to the case of the first embodiment, the leg part attachment member 150*b* in accordance with the second embodiment for the rear-side leg part having securely installed therein the rear leg of the seat 200 is provided with the pin-formed part 53 for positioning. As illustrated in FIGS. 20(*a*) and 20(*b*), the pin-formed part 53 is formed on an opposed surface side of the leg part attachment member 150*b* to the reference member 111. On the other hand, on a bottom surface in the catch-formed part 131 of the reference member 111, a plurality of positioning holes 133 enabling the pin-formed part 53 included in the leg part attachment member 150*b* to be fitted therein are formed at predetermined intervals to keep away from the installation position of the track rail 121 included in the linear guide 120. The positioning holes 133 in accordance with the second embodiment are formed on the bottom surface of the catch-formed part 131 having the dovetail-groove-shaped cross-section at regular intervals such as at one-inch pitches. By fitting the pin-formed part 53 into the positioning hole 133, positioning of the leg part attachment member 150*b* can be performed. That is, with use of the pin-formed part 53 and the positioning hole 133, positioning of the seat 200 attached to the leg part attachment member 150*b* can be performed accurately and easily.

As described above, in a normal case in which the leg part attachment member 150*b* is not subject to an external force, force is applied in the direction in which the leg part attachment member 150*b* and the moving block 123 separate from each other due to the effect of the elastic force of the coil spring 68, and a state in which the leg part attachment member 150*b* is lifted upward with respect to the moving block 123 is thus maintained. In this case, fitting between the pin-formed part 53 and the positioning hole 133 is released due to the effect of the elastic force of the coil spring 68, and a state illustrated in FIG. 20(*a*) is maintained.

Under such a state in which the seat 200 can move, when an external force for movement is applied to the seat 200, each of the leg part attachment members 150*a* and 150*b* connected to the seat 200 moves along the track rail 121 due to the effect of the linear guide 120. At this time, by moving the seat 200 while pressing the leg part attachment member 150*b* slightly downward, a position to allow the pin-formed part 53 and the positioning hole 133 to be fitted with each other, that is, one of the one-inch-pitch positions for positioning the seat 200, can be searched. When a desired seat positioning position is determined, the locking mechanism 160 is made to function to cause each of the leg part attachment members 150a and 150b to exhibit a downward pressing force. Due to the effect of the downward pressing force against the effect of the elastic force of the coil spring 68, the leg part attachment member 150b moves in a direction toward the reference member 111 (moving block 123), and the pin-formed part 53 and the positioning hole 133 are fitted and positioned. Also, each of the leg part attachment members 150a and 150b is pressed to the reference member 111, and the binding state between each of the leg part attachment members 150a and 150b and the flanged part 64 pressing the inner wall surface of the catch-formed part 131 outward is carried out.

Meanwhile, similarly to the case of the first embodiment, the pin-formed part 53 for positioning is formed only in the leg part attachment member 150b for the rear-side leg part of the seat 200 and is not formed in the leg part attachment member 150a for the front-side leg part of the seat 200 (refer to FIGS. 19(a) and 19(b)). Such a configuration is employed in consideration of the fact that providing both the front and rear leg parts of the seat 200 with the positioning functions may make it difficult to perform stable and reliable positioning due to a formation error of the positioning hole 133, an error of the device, and the like. The fitting between the pin-formed part 53 and the positioning hole 133 for positioning of the seat 200 may be provided either on the front side or on the rear side. Thus, although the pin-formed part 53 for positioning is formed only in the leg part attachment member 150b for the rear-side leg part of the seat 200 in the aforementioned second embodiment, the pin-formed part 53 may be formed only in the leg part attachment member 150a for the front-side leg part of the seat 200.

Configurations and effects of the second embodiment other than those described above are basically similar to those of the first embodiment. Accordingly, in the seat moving/securing device 100 in accordance with the second embodiment, stable moving/securing operations can be achieved, and long duration of the device is also achieved.

Also, similarly to the case of the first embodiment, the seat moving/securing device 100 in accordance with the second embodiment described above can be used by installing the seat 200 of an aircraft on the seat moving/securing device 100 as illustrated in FIGS. 12(a) and 12(b). Thus, in accordance with the second embodiment, it is possible to provide the seat moving/securing device 100 enabling the seat 200 to be moved and secured easily and quickly.

Figure 21:
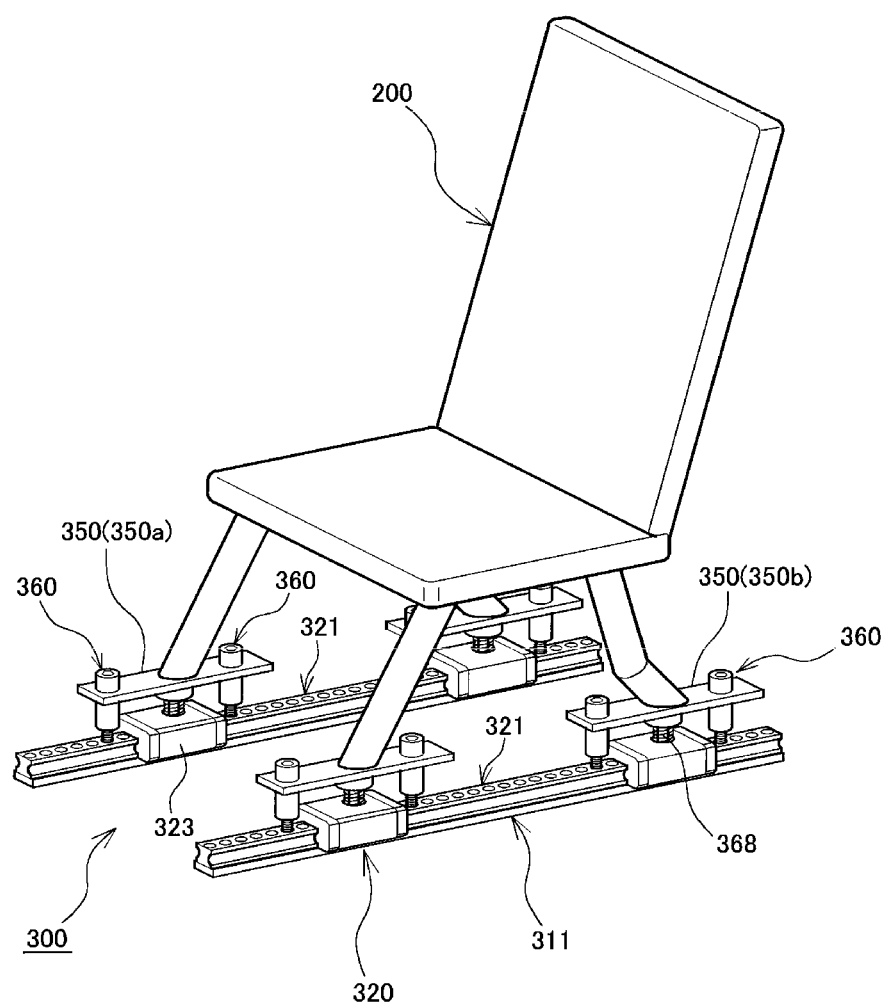
FIG. 21 is a perspective view illustrating a configuration example of a seat moving/securing device in accordance with a third embodiment.
Figure 22A:
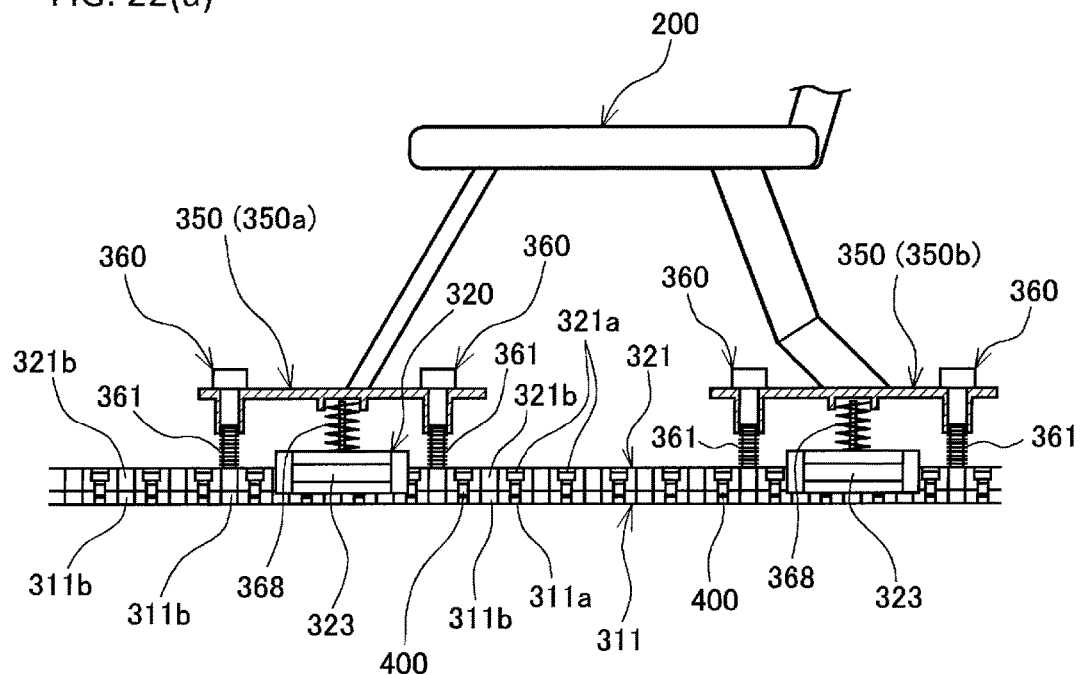
FIGS. 22(a) and 22(b) each describes the seat moving/securing device in accordance with the third embodiment.
Figure 22B:
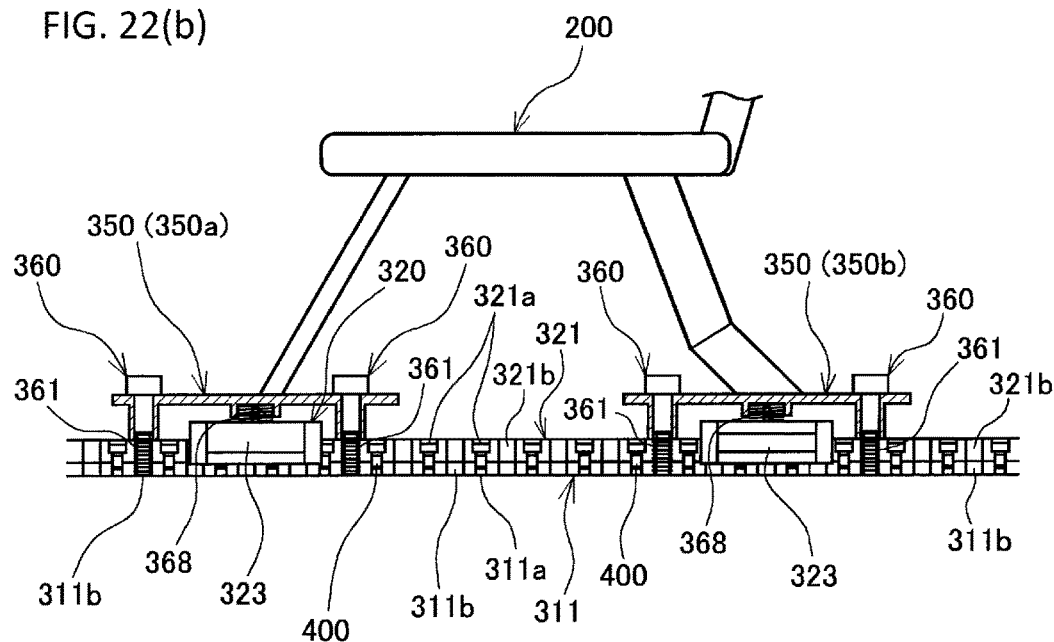

The first and second embodiments as application examples of the present invention have been described above. Each of the aforementioned first and second embodiments includes the catch-formed part 31 having a dovetail-groove-shaped cross-section and each of the locking mechanisms 60 and 160 each including the rod housing 61 having a hollow hole and the rod member 63 serving as a shaft-like member provided to pass through the hollow hole included in the rod housing 61 and including on one end side thereof the flanged part 64 and including on the other end side thereof the operation lever part 65 formed in a cam shape. However, an embodiment other than the examples each including the catch-formed part 31 having a dovetail-groove-shaped cross-section and each of the aforementioned locking mechanisms 60 and 160 can be applied to the seat moving/securing device according to the present invention. With reference to FIGS. 21, 22(a), and 22(b), a seat moving/securing device 300 in accordance with a third embodiment differing from the first and second embodiments will be described.

[Seat Moving/Securing Device 300 in Accordance with Third Embodiment]

FIG. 21 is a perspective view illustrating a configuration example of a seat moving/securing device in accordance with a third embodiment. FIGS. 22(a) and 22(b) each describes the seat moving/securing device in accordance with the third embodiment. FIG. 22(a) illustrates a state in which binding of a seat is released, and FIG. 22(b) illustrates a state in which the binding of the seat is carried out. It is to be noted that, in a seat moving/securing device 300 in accordance with the third embodiment described below, similar or identical components to those in the first and second embodiments are shown with the same reference numerals, and description of the duplicate components may be omitted.

The seat moving/securing device 300 in accordance with the third embodiment is configured to include a long reference member 311 extending in a longitudinal direction of a seat installation surface and securely installed, a leg part attachment member 350 having securely installed therein a leg part of the seat 200, a linear guide 320 attached between the long reference member 311 and the leg part attachment member 350 and enabling the leg part attachment member 350 to move horizontally along a longitudinal direction of the long reference member 311, and a locking mechanism 360 securely installed on the leg part attachment member 350.

The reference member 311 is a long member securely installed on the seat installation surface and a member serving as a reference of the seat moving/securing device 300 in accordance with the third embodiment. As illustrated in FIGS. 22(a) and 22(b), the reference member 311 is provided with a plurality of attachment holes 311a and 311b at predetermined intervals in the longitudinal direction. In FIG. 22, the attachment holes 311a are screw holes for use in connection and securement to a track rail 321 included in the linear guide 320, and the attachment holes 311b are screw holes for use in connection and securement to attachment/securement bolts 361 included in the locking mechanism 360.

The leg part attachment member 350 is a member having securely installed therein the leg part of the seat 200, and, in the present embodiment, the leg part attachment member 350a for the front-side leg part having securely installed therein the front leg of the seat 200 and the leg part attachment member 350b for the rear-side leg part having securely installed therein the rear leg of the seat 200 have equal configurations. The leg part attachment member 350 (350a and 350b) in accordance with the third embodiment has a gate-like external shape and includes a pair of locking mechanisms 360 on both sides in the front-and-rear direction of the slide movement direction, which is the longitudinal direction of the reference member 311 and the track rail 321.

Between the reference member 311 and the leg part attachment member 350 (350a and 350b), the linear guide 320 enabling the leg part attachment member 350 (350a and 350b) to move horizontally along the longitudinal direction of the long reference member 311 is installed. The linear guide 320 in accordance with the present embodiment is of a similar type to the linear guide 120 illustrated in FIG. 17 and includes the track rail 321 serving as a track member and a moving block 323 serving as a moving member movably attached to the track rail 321 via the plurality of balls 122.

The track rail 321 is a long member having an approximately rectangular cross-section and is provided on outer circumferential side surfaces thereof with the load rolling grooves 121a each on the right and left sides enabling the balls 122 to be received in the grooves and formed over the entire length of the track rail 321. The track rail 321 is provided with a plurality of bolt attachment holes 321a and opening holes 321b appropriately spaced in the longitudinal direction thereof. The track rail 321 is secured to the reference member 311 by inserting bolts 400 into the plurality of bolt attachment holes 321a and screwing the bolts 400 into the attachment holes 311a formed in the reference member 311.

The opening hole 321b formed in the track rail 321 is a hole adapted to have the attachment/securement bolt 361 included in the locking mechanism 360 inserted therein. As illustrated in FIG. 22(b), a secured state between the reference member 311 and the leg part attachment member 350 (350a and 350b) is achieved by inserting the attachment/securement bolt 361 included in the locking mechanism 360 into the opening hole 321b formed in the track rail 321 and screwing the attachment/securement bolt 361 into the attachment hole 311b formed in the reference member 311.

Here, the leg part attachment member 350 (350a and 350b) in accordance with the third embodiment is provided approximately at a center position of the gate-like shape with a coil spring 368 serving as an elastic body, and the coil spring 368 connects the leg part attachment member 350 (350a and 350b) to the moving block 323. The coil spring 368 can exhibit a pressing force (elastic force). Accordingly, as illustrated in FIG. 22(a), in a case in which binding of the leg part attachment member 350 (350a and 350b) is released, a force is applied in directions in which the leg part attachment member 350 (350a and 350b) and the moving block 323 separate from each other due to the effect of the elastic force of the coil spring 368, and a state in which the leg part attachment member 350 (350a and 350b) is lifted upward with respect to the moving block 323 is thus maintained. At this time, the seat 200 can move freely in the front-and-rear sliding direction. In the third embodiment, since the coil spring 368 is installed approximately at the center position of the gate-like leg part attachment member 350 (350a and 350b), upward movement of the leg part attachment member 350 (350a and 350b) based on the elastic force of the coil spring 368 is achieved in a stable manner.

On the other hand, in a state in which the locking mechanism 360 functions, that is, in a state in which a downward pressing force against the effect of the elastic force of the coil spring 368 is applied to the side of the seat 200, by inserting the attachment/securement bolt 361 included in the locking mechanism 360 into the opening hole 321b formed in the track rail 321 and screwing the attachment/securement bolt 361 into the attachment hole 311b formed in the reference member 311, the secured state between the reference member 311 and the leg part attachment member 350 (350a and 350b) can be achieved. That is, a state in which the binding of the leg part attachment member 350 (350a and 350b) is carried out as illustrated in FIG. 22(b) can be achieved. Since this binding state is carried out by screwing connection between the attachment/securement bolt 361 and the attachment hole 311b, this binding state can suitably receive any external force to be applied to the seat 200. Also, as illustrated in FIG. 22(b), when the locking mechanism 360 functions, the gate-like leg part attachment member 350 (350a and 350b) is in a state of pressing the gate-like leg part to the upper surface of the track rail 321. Such a state thus contributes to achievement of the stable secured state between the reference member 311 and the leg part attachment member 350 (350a and 350b).

The seat moving/securing device 300 in accordance with the third embodiment has been described above as one of various embodiments to which the present invention can be applied. In the seat moving/securing device 300 in accordance with the third embodiment, the seat 200 can be moved and secured easily and quickly in a similar manner to that in the case of the first or second embodiment.

Although the embodiments of the present invention have been described above, the technical scope of the present invention is not limited to the scope described in the above embodiments. The above embodiments can be changed or modified in various ways.

For example, in each of the above embodiments, description has been provided based on an assumption that the number of leg parts of the seat 200 is four in total: two for each of the front and rear portions. However, the number of the leg parts of the seat 200 may be any number, and the configuration of the seat moving/securing device 10 or 100 may be changed in accordance with the number of leg parts. That is, the number of leg part attachment members 150a for the front-side leg part and leg part attachment members 150b for the rear-side leg part of the seat 200 can arbitrarily be changed.

Also, in each of the above embodiments, a configuration of arranging in parallel the leg part attachment member 150a for the front-side leg part and the leg part attachment member 150b for the rear-side leg part of the seat 200 has been illustrated. However, the scope of the present invention is not limited to the configuration of the parallel arrangement, and a configuration of arranging in series the leg part attachment member 150a for the front-side leg part and the leg part attachment member 150b for the rear-side leg part of the seat 200 can be employed.

Also, for example, the shape of the leg part attachment member 150 (150a and 150b), the attachment position of the locking mechanism 60 or 160 to the leg part attachment member 150 (150a and 150b), the formation position and shape of the pin-formed part 53, and the like can arbitrarily be changed within the scope of enabling a similar effect to that of each of the above embodiments to be exerted.

Also, for example, each of the above embodiments has illustrated that, by arbitrarily changing the cam shape formed in the operation lever part 65, the binding carrying-out state and the binding releasing state are switchable as a resulting state caused by turning down and tilting the operation lever part 65 into the laid state and a resulting state caused by turning up and tilting the operation lever part 65 into the upright state. That is, whether the binding state is established when the operation lever part 65 is turned down or when the operation lever part 65 is turned up can arbitrarily be selected in accordance with conditions and the like of a place to install the seat moving/securing device according to the present invention.

Also, for example, in each of the above embodiments, a case in which the rod housing 61 and the leg part attachment member 50 or 150 are configured as separate members has been illustrated. However, the rod housing 61 and the leg part attachment member 50 or 150 can be configured as an integral member.

Also, for example, in each of the above embodiments, the leg part attachment member 150 (150a or 150b) or 350 (350a or 350b) is installed individually to each of the leg parts provided at the front and rear portions of the seat 200.

Figure 23A:
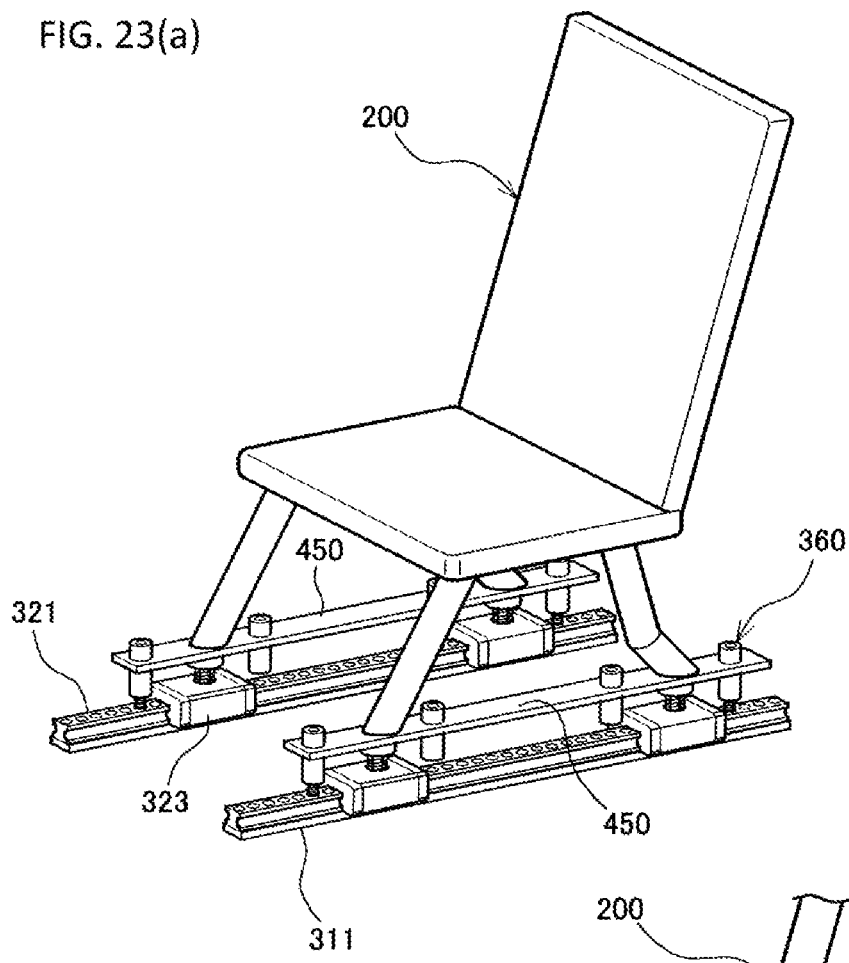
FIGS. 23(a) and 23(b) each illustrates a modification example of the seat moving/securing device in accordance with the third embodiment.
Figure 23B:
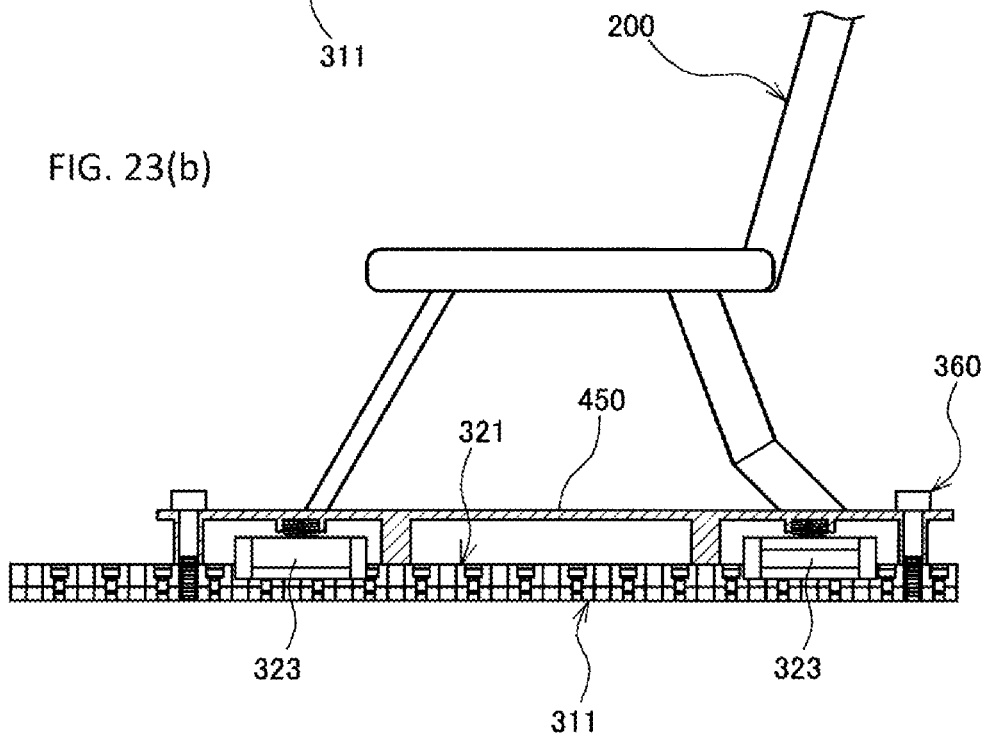

However, the leg part attachment member according to the present invention can be formed to connect the plurality of leg parts of the seat 200 to each other. A specific example thereof is illustrated in FIGS. 23(*a*) and 23(*b*). FIGS. 23(*a*) and 23(*b*) each illustrates a modification example of the seat moving/securing device in accordance with the third embodiment. FIG. 23(*a*) is an external perspective view of the device, and FIG. 23(*b*) is a side view of the device. As illustrated in FIGS. 23(*a*) and 23(*b*), by employing a leg part attachment member 450 formed to extend in the longitudinal direction to connect the front and rear leg parts of the seat 200 to each other, the leg part attachment member 450 can press the track rail 321 over a broader range of the upper surface of the track rail 321. Accordingly, by employing the configuration illustrated in FIGS. 23(*a*) and 23(*b*), a more secured state between the reference member 311 and the leg part attachment member 450 can be achieved.

Also, a case in which the seat moving/securing device 10, 100, or 300 in accordance with each of the above embodiments is used by installing the seat 200 of an aircraft on the seat moving/securing device 10, 100, or 300 as illustrated in FIGS. 12(*a*) and 12(*b*) or the like has been illustrated. However, the application range of the seat moving/securing device according to the present invention is not limited to the field of the aircraft. The seat moving/securing device according to the present invention can be applied to any places, means, buildings, and the like enabling an effect to be obtained by moving and securing the seat 200 easily and quickly such as transportation means, such as a motorcoach, other than the aircraft, and accommodation facilities, such as a theater, a movie theater, and a gymnasium.

Also, in the seat moving/securing device 300 in accordance with the aforementioned embodiment, as illustrated in FIGS. 21 to 23, the track rail 321 and the reference member 311 are provided with the multiple bolt attachment holes 321*a*, opening holes 321*b*, and attachment holes 311*a* and 311*b*. However, these holes may be provided in accordance with the securement intervals of the seat moving/securing device, and the intervals and number of the holes are not required to be those illustrated in the figures. In the present invention, the installation intervals and the installation number of the bolt attachment holes 321*a*, opening holes 321*b*, and attachment holes 311*a* and 311*b* can arbitrarily be changed.

It is apparent from the description of the claim that embodiments changed or improved in the above manner can fall within the technical scope of the present invention.

REFERENCE NUMERALS

10, 100, 300: seat moving/securing device, 11, 111, 311: reference member, 20, 120, 320: linear guide, 21, 121, 321: track rail, 21*a*, 121*a*: load rolling groove, 21*b*, 121*b*: bolt attachment hole, 22, 122: ball, 23, 123, 323: moving block, 23*a*, 123*a*: load rolling groove, 25, 125: load rolling path, 26, 126: returning path, 27: direction change path, 28, 128: lid part, 29: no-load rolling path, 30: endless circuit, 31, 131: catch-formed part, 33, 133: positioning hole, 50, 150, 350: leg part attachment member, 50*a*, 150*a*, 350*a*: leg part attachment member (for front-side leg part of seat), 50*b*, 150*b*, 350*b*: leg part attachment member (for rear-side leg part of seat), 51: leg part attachment hole, 53: pin-formed part, 60, 160, 360: locking mechanism, 61: rod housing, 62: screw, 63: rod member, 64: flanged part, 65: operation lever part, 67: bush, 68, 368: coil spring, 200: seat, 311*a*, 311*b*: attachment hole, 321*a*: bolt attachment hole, 321*b*: opening hole, 361: attachment/securement bolt, 400: bolt, 450: leg part attachment member

The invention claimed is:

1. A seat moving/securing device comprising:
   a long reference member extending in a longitudinal direction of a seat installation surface and securely installed;
   a leg part attachment member having securely installed therein a leg part of a seat;
   a linear guide attached between the long reference member and the leg part attachment member and enabling the leg part attachment member to move horizontally along a longitudinal direction of the long reference member; and
   a locking mechanism securely installed on the leg part attachment member,
   wherein an elastic body exhibiting a pressing force is installed between the leg part attachment member and the linear guide,
   wherein either the long reference member or a track rail included in the linear guide is provided with a catch-formed part extending in the longitudinal direction and having a dovetail-groove-shaped cross-section,
   wherein the locking mechanism consists of:
      a rod housing having a hollow hole; and
      a rod member serving as a shaft-like member provided to pass through the hollow hole included in the rod housing and including on a first end side thereof a flanged part and including on a second end side thereof an operation lever part, and
   wherein by securely installing the rod housing to the leg part attachment member and inserting and installing the flanged part included in the rod member in the catch-formed part, when the operation lever part is located at a first position, a projecting amount of the flanged part side of the rod member projecting from the rod housing decreases, and the leg part attachment member and the flanged part interpose a groove entrance of the catch-formed part therebetween from a groove upper part and a groove inner part and press each other, or the leg part attachment member and the flanged part press an inner wall surface of the catch-formed part outward in reverse directions from each other, to carry out a binding state, and when the operation lever part is located at a second position, the projecting amount of the flanged part side of the rod member projecting from the rod housing increases, and the leg part attachment member and the flanged part move away from each other from the groove upper part and the groove inner part of the groove entrance of the catch-formed part, or the leg part attachment member and the flanged part respectively move away from the inner wall surface of the catch-formed part inward, to release the binding state.

2. The seat moving/securing device according to claim 1, wherein the leg part attachment member and the linear guide are connected via a bush made of a soft material having a buffering function.

3. The seat moving/securing device according to claim 2, wherein
   a pin-formed part for positioning is formed on an opposed surface side of the leg part attachment member to the long reference member or the track rail,
   a plurality of positioning holes enabling the pin-formed part to be fitted therein are formed at predetermined intervals on an opposed surface side of the long reference member or the track rail to the leg part attachment member, and by fitting between the pin-formed part and the positioning hole, positioning of the leg part attachment member is performed.

4. The seat moving/securing device according to claim 3, wherein between the leg part attachment member and the linear guide, the elastic body is installed to surround the bush, normally, the fitting between the pin-formed part and the positioning hole is released due to an effect of the pressing force exhibited by the elastic body, and when the locking mechanism functions to cause the binding state between the leg part attachment member and the flanged part pressing a neighborhood of the catch-formed part to be carried out, the fitting between the pin-formed part and the positioning hole is performed against the effect of the pressing force exhibited by the elastic body.

5. The seat moving/securing device according to claim 1, wherein the leg part attachment member has a gate shape, and the elastic body is located approximately at a center part of the leg part attachment member having the gate shape.

* * * * *